United States Patent
Choi

(10) Patent No.: US 10,254,012 B2
(45) Date of Patent: Apr. 9, 2019

(54) SENSIBLE THERMAL ENERGY STORAGE (STES) SYSTEMS

(71) Applicant: Peter B. Choi, St. Davids, PA (US)

(72) Inventor: Peter B. Choi, St. Davids, PA (US)

( * ) Notice: Subject to any disclaimer, the term of this patent is extended or adjusted under 35 U.S.C. 154(b) by 252 days.

(21) Appl. No.: 15/258,713

(22) Filed: Sep. 7, 2016

(65) Prior Publication Data

US 2017/0067667 A1   Mar. 9, 2017

Related U.S. Application Data

(60) Provisional application No. 62/215,207, filed on Sep. 8, 2015.

(51) Int. Cl.
   *F24J 2/34*  (2006.01)
   *F24S 60/00*  (2018.01)
   (Continued)

(52) U.S. Cl.
   CPC .......... *F24S 60/00* (2018.05); *F03G 6/068* (2013.01); *F24S 20/20* (2018.05); *F24S 80/20* (2018.05);
   (Continued)

(58) Field of Classification Search
   CPC ..... F28D 2020/0047; F28D 2020/0043; F28D 2020/0039; F28D 2020/0034
   (Continued)

(56) References Cited

U.S. PATENT DOCUMENTS

| | | | |
|---|---|---|---|
| 2010/0175689 A1* | 7/2010 | Zillmer | F16L 9/18 126/90 R |
| 2010/0199669 A1* | 8/2010 | Gathmann | F03G 6/005 60/641.8 |

(Continued)

OTHER PUBLICATIONS

Mathew L. Bauer, Rajgopal Vijaykumar, Mark Lausten, and Joseph Stekli, Pathways to cost competitive concentrated solar power incorporating supercritical carbon dioxide power cycles, The 5th International Symposium—Supercritical CO2 Power Cycles, San Antonio, Texas, Mar. 28-31, 2016: Relevant pages; p. 4 (Figure 1 for properties of heat transfer fluid); p. 10 (development of supercritical CO2 receiver); p. 13 (MgCl2—KCl with Mg additive).

(Continued)

*Primary Examiner* — Avinash A Savani
*Assistant Examiner* — Rabeeul I Zuberi
(74) *Attorney, Agent, or Firm* — John H. Choi & Associates LLC

(57) ABSTRACT

Two sensible thermal energy storage (STES) systems in multiple chambers containing molten eutectic salts have been devised for use at temperatures above 565° C. For the first type, the thermal energy of low specific heat of an immiscible gaseous heat transfer fluid (HTF) at temperatures above 900° C. is readily converted to dispatchable heat of high specific heat in the molten eutectic salt liquid layers operating at high temperatures, which can again produce a gaseous HTF at a constant temperature of 700° C. or higher for the lower electricity generation capacities. For the second type, the molten eutectic salt liquids are used as a thermal energy storage (TES) medium and also a HTF at temperatures above 700° C. for the higher electricity generation capacities. These STES systems provide an effective cushion against the disturbances of heat supply from the sun.

2 Claims, 9 Drawing Sheets

(51) Int. Cl.
*F28D 20/00* (2006.01)
*F03G 6/06* (2006.01)
*F24S 80/20* (2018.01)
*F24S 20/20* (2018.01)

(52) U.S. Cl.
CPC .. *F28D 20/0034* (2013.01); *F28D 2020/0047* (2013.01); *Y02E 10/41* (2013.01); *Y02E 10/46* (2013.01); *Y02E 60/142* (2013.01)

(58) Field of Classification Search
USPC .............................. 60/641.8, 641.14, 641.15
See application file for complete search history.

(56) References Cited

U.S. PATENT DOCUMENTS

| | | | | |
|---|---|---|---|---|
| 2011/0017196 | A1* | 1/2011 | Bell | F24D 11/003 126/400 |
| 2013/0255254 | A1* | 10/2013 | Ehrsam | F03G 6/003 60/641.8 |
| 2014/0000583 | A1* | 1/2014 | Kotze | F01K 3/12 126/618 |
| 2015/0096299 | A1* | 4/2015 | Sakadjian | F03G 6/003 60/641.8 |
| 2015/0128931 | A1* | 5/2015 | Joshi | F01K 3/12 126/714 |

OTHER PUBLICATIONS

C. Chen, T. Tran, R. Olivares, S. Wright, S. Sun, Coupled Experimental Study and Thermodynamic Modeling of Melting Point and Thermal Stability of Li2CO3—Na2CO3—K2CO3 Based Salts, Journal of Solar Energy Engineering, vol. 136, Aug. 2014: Relevant pages; p. 031017-4 (Fig. 7, stability of Li2CO3—Na2CO3—K2CO3 in CO2 atmosphere).

Clifford K. Ho and Brian D. Iverson, Review of High-Temperature Central Receiver Design for Concentrating Solar Power, Renewable and Sustainable Energy Reviews, 29, 835-846, 2014: Relevant pages; p. 843 (Table 1, Summary of receiver designs).

Bernhard Hoffschmidt, Receivers for Solar Tower Systems, Presentation by German Aerospace Center (DLR), Font Romeu, France, Jun. 25-27, 2014: Relevant pages; p. 18 (Technology in Pilot-Phase: Receiver Development).

G. J. Janz, C. B.Allen, N.P. Bansal, R.M. Murphy, and R. P. T. Tomkins, Physical Properties Data Compilations Relevant to Energy Storage, II. Molten Salts: Data on Single and Multi-Component Salt Systems, NSRDS, U.S. Department of Commerce, Apr. 1979: Relevant pages; p. 107 (Li2CO3); p. 118 (Na2CO3), p. 128 (K2CO3); p. 351 (Li2CO3—Na2CO3—K2CO3); p. 366 (Li2CO3—Na2CO3); p. 380 (Li2CO3—K2CO3).

Randy J. Petri, Terry D. Clear, Ray R. Tison, and Leonard G. Marianowski, High-Temperature Molten Salt Thermal Energy Storage Systems, NASA CR-159663, Institute of Gas Technology, prepared for NASA and U.S. Department of Energy, Feb. 1980: Relevant pages; p. 44 (effects of a definite partial pressure of CO2 on decomposition of molten carbonate salts); p. 109 (corrosion test results with aluminum foam in the molten carbonate salt of Li2CO3—Na2CO3—K2CO3).

SunShot Vision Study, U.S. Department of Energy, Feb. 2012: Relevant pages; p. 112 (parasitic power consumption in a CSP plant).

Peter Zehner and Matthias Kraume, Bubble Columns, BASF, Federal Republic of Germany, Wiley-VCH Verlag GmbH & Co., KGaA, Weinheim, 2005: Relevant pages; p. 14 (up to 30 m2/m3 of heat transfer area being installed in a bubble column); p. 15 (Figure 19, heat transfer coefficients higher than 2 KW/m2.K attained on steel surfaces in a bubble column).

* cited by examiner

SENSIBLE THERMAL ENERGY STORAGE (STES) SYSTEMS

CROSS-REFERENCE TO RELATED APPLICATION

This application claims priority to U.S. Provisional Application No. 62/215,207, filed on Sep. 8, 2015.

FIELD OF INVENTION

The present invention is related to the storage and the release of thermal energy in the sensible thermal energy storage (STES) containing molten eutectic salt liquids at temperatures above 565° C., the stored thermal energy being used for generation of electricity in the night.

BACKGROUND OF THE INVENTION

In the commercial concentrated solar power (CSP) applications, sensible thermal energy storage (STES) for the high temperature solar collectors is available for temperatures up to 565° C. For example, the solar salt a binary eutectic mixture of $KNO_3$ (54 wt. %) and $NaNO_3$ (46 wt. %) has been mainly used as a thermal energy storage (TES) medium for the parabolic trough collectors with a synthetic oil employed as a heat transfer fluid (HTF) at temperatures up to 400° C. For the power tower, the solar salt is used as a TES medium as well as a HTF up to 565° C. For thermal energy above 565° C., the solar salt is not suitable for the service, because it becomes thermally unstable above this temperature.

The solar salt in molten liquid state has been used only as a TES medium for the parabolic trough collectors, but not as a HTF, because the solar fields of the parabolic trough collectors have complex HTF distribution piping that makes it difficult to provide with a means for freezing protection for the molten solar salt that has a melting temperature of 222° C. Therefore, synthetic oil such as Dowtherm A having a melting point of 12° C. has been widely used as a HTF. This synthetic oil can be used only up to 400° C., however, because it becomes thermally unstable above this temperature.

The molten solar salt has been used as both a TES medium and also a HTF for the power tower receiver that produces thermal energy above 500° C. for liquid HTF. As the HTF piping between the power tower receiver and the thermal energy storage tank is relatively simple in this case, it has been possible to provide the HTF piping with a freezing protection capability. The solar salt, however, becomes thermally unstable from around 565° C., and cannot be used above this temperature. Thus, a new heat storage process is necessary for the storage temperatures above 565° C. using a TES medium other than the solar salt. As for the HTF, a new heat transfer process is also necessary for the service temperatures above 400° C. using a thermally stable HTF other than the synthetic oil.

The candidates for the new TES medium include the eutectic mixtures of carbonate, chloride, and fluoride alkali metal compounds that can be used between 565° C. and 850° C. Unlike the solar salt, they are very corrosive making it more costly to employ the process equipment units constructed of high nickel alloys that are compatible with the molten salt liquids. Also, the carbonate salts are thermally unstable at the service temperatures.

The candidates for the new HTF can be found from the experiences in the nuclear power industry. As a liquid HTF, molten metal or metal salts such as Na, Pb and NaK have been used as a HTF, but have low specific heat making it difficult to be used as a TES medium at the same time. Na and NaK are also very flammable when spilled, so the safety is a major concern. Molten eutectic salts such as LiF—NaF—KF (46.5-11.5-42 mole %) and NaF—$NaBF_4$ (8-92 mole %) have been tried as a liquid HTF for the molten salt nuclear reactors at temperatures around 700° C. In this case, the process equipment surfaces contacting the HTF must have been constructed of high nickel alloys for corrosion protection. This need makes the fluoride salts too expensive to be used for CSP plants. As for a gaseous HTF, simple inorganic gases such as He and $CO_2$ have been used at high pressures. The gases have very low heat capacities, and cannot provide a cushion even for the disturbances from the heat sources such as those caused by clouds in solar irradiation. At the present time, by using a tubular receiver, the power tower receiver can heat a gaseous HTF above 800° C. and a liquid HTF above 600° C. at high pressures as indicated by Ho and Iverson (2014).

Carbonate alkali metal salts have been studied by Petri et al. (1980) in search of TES materials in high temperature applications. It was found that the decomposition is minimized on molten $Li_2CO_3$, $Na_2CO_3$ and $K_2CO_3$ by maintaining a finite partial pressure of $CO_2$ gas. Chen et al. (2014) also reported on the thermal stability of eutectic ternary mixture of $Li_2CO_3$—$Na_2CO_3$—$K_2CO_3$ in a composition of 32, 33 and 35 wt. %, respectively, having melting temperature of 397° C. that it was thermally stable up to 1000° C. in the $CO_2$ gas atmosphere.

In addition, Petri et al. (1980) tested the molten salt of a ternary eutectic mixture $Li_2CO_3$—$Na_2CO_3$—$K_2CO_3$ with a Duocel aluminum foam in aluminum crucibles at 450° C. The aluminum foam was found very compatible in corrosion with the molten salt liquid forming a thin protective layer, possibly of $LiAlO_2$, on the metal surfaces.

Lately, Glatzmaier and Gomez (2015) have suggested aluminum coating for use in storage tanks and process equipment units in the CSP applications at temperatures up to 850° C. Their analysis shows that the aluminum coated equipment would cost about twice as much as the stainless steel, whereas the high nickel alloys compatible with the molten carbonate salts sometimes would do more by an order of magnitude than the stainless steel.

As for the thermal stability of the $CO_2$ gas, it is stable at the service temperatures up to 1000° C. For example, the decomposition composition of a pure $CO_2$ gas at 1000° C. is 0.011% at 1 bar, 0.005% at 10 bar, and 0.0024% at 100 bar.

The material of construction for the $CO_2$ gas at high temperatures is also reported. For the service temperatures below 450° C., low alloy, temperature resisting, ferric steels containing molybdenum, chromium, or both can be used; in temperatures between 300° C. and 700° C., austenitic stainless steels; and in temperature up to 1000° C., Ni—Cr or Ni—Cr—Fe alloys.

According to Bauer et al. (2016), the SunShot Initiative is supporting a research for development of a power tower receiver for directly heating supercritical $CO_2$ at pressures up to 250 bar and temperatures up to 700° C. Even though the supercritical $CO_2$ at these conditions can be used as a working fluid for the supercritical $CO_2$ ($sCO_2$) Brayton cycle, this material cannot be utilized as a TES medium.

SunShot Initiative also supports the development of a eutectic binary mixture of $MgCl_2$-KCl with a Mg metal additive as a corrosion inhibitor, according to Bauer et al. (2016). Once the research becomes successful in commercial applications, the $MgCl_2$—KCl eutectic mixture having melting temperature of 435° C. can be readily utilized in the multi-chamber STES system of this invention where the Mg additive slurry can be bubbled with an inert gas in the chambers.

As for the applications requiring an immiscible HTF above 400° C. where the organic synthetic oil can no longer be used, the simple inorganic gases such as air, Ar, He, $N_2$ and $CO_2$ are the only choices at the moment. The gaseous HTF's, however, usually require very high volumetric flow rates at moderate pressures due to their low volumetric specific heat capacity limiting their use.

The bubble columns, where the mass transfer and heat transfer for chemical reactions are promoted by introducing the gaseous reactants into a slurry layer, have been used for volumetric heat transfer coefficients up to around 60 $KW/m^{3.\circ}$ C. by using the submerged heat exchangers as described by Zehner and Kraume (2005). Even in this case, a large portion of sensible heat must have been transferred by direct contact heat transfer between the gas bubbles and liquid layer before the fluid mixture contacts the heat exchanger tube surfaces. When the required volumetric heat transfer coefficient is very low such as for the STES system for CSP plants with the heat transfer coefficients of around 3 $KW/m^{3.\circ}$ C. needed, only the direct contact heat transfer can be used. This heat transfer method obviates the need of a heat exchanger between the hot gaseous HTF stream from the power tower receiver and the heat storage medium of corrosive molten salt.

Numerous such bubble columns are presently operating worldwide for chemical synthesis in petrochemical industries. The Fisher-Tropsch reactors, for example, have been operating in sizes of up to 10 meters in diameter and 40 meters in height at operating temperatures of around 250° C. and pressures of 20 to 40 bar for more than a half century. The reactor takes as feedstocks a gaseous mixture of carbon monoxide and hydrogen into a hydrocarbon liquid layer containing metal catalyst particles. Also, the ebullated bed reactors for hydroconversion of petroleum residua operate in sizes of up to 5 meters in diameter and 30 meters in height at around 450° C. and 240 bar. The reactors use hydrogen gas and petroleum residua liquid as feedstocks with metal catalyst particles. As a matter of fact, they are the most reliable reactors being in use for the chemical industry.

At the present time, there is no reliable TES system available for the commercial CSP plants at service temperatures above 565° C. the highest temperature at which the molten solar salt can be used. In order to increase the cycle efficiency of the thermodynamic cycle engines, however, the engines need to operate at temperatures higher than this limit. For example, the sCO2 Brayton cycle engine can achieve the cycle efficiency of 50% at around 700° C., whereas the steam Rankine cycle presently operating with the solar salt at 565° C. achieves cycle efficiency of around 40%. Since the solar power towers can generate thermal energy with the gaseous HTF at temperatures higher than 800° C. and with the liquid HTF higher than 600° C., new methods must be devised to harness the thermal energy of such quality.

BRIEF SUMMARY OF THE INVENTION

The first embodiment of this invention utilizes a multi-chamber STES system with a molten salt liquid of eutectic salt mixtures as a TES medium and with an immiscible inert gas as a HTF. As the liquids are highly corrosive at the service temperatures above 565° C., the direct contact heat transfer by gas bubbling with an immiscible HTF is very advantageous for heat transfer instead of the indirect heat transfer by heat exchangers. Typically, the STES systems operate in the temperature ranges between 600° C. to 800° C., while the immiscible HTF gas is heated to a temperature near 900° C. by a power tower receiver. The immiscible HTF gas at these high temperatures transfers thermal energy to the heat storage medium, and also to the thermodynamic cycle engines at a constant temperature of 700° C. or higher. Because of the unbearably high volumetric flow rates for the utility plants in sizes above 50 MWe at the moderate pressures, the multi-chamber STES system with the gaseous HTF is feasible only for electricity generation of the lower capacities.

The second embodiment of this invention utilizes a multi-chamber STES system with a molten salt liquid of eutectic mixtures as a TES medium and also as a HTF. The multi-chamber STES system provides an empty chamber in a sequence operation to receive the thermally charged hot stream from the power tower receiver in the daytime or the discharged cold stream from the heat recovery exchangers in the nighttime. The multi-chamber STES system in this sequence operation yields the high heat storage and heat recovery efficiencies because no streams at different temperatures are mixed during the heat transfer operation. This operation also requires about a half of the total storage volume as compared with that of the two tank system of the solar salt having the power tower receiver exit temperature of 565° C.

The first embodiment of this invention utilizing a multi-chamber STES system with a molten salt liquid of eutectic mixtures as a TES medium and with an immiscible inert gas as a HTF is further described below.

The multi-chamber system with an immiscible inert gas used as a HTF containing a plurality of chambers, the first embodiment of the multi-chamber system in this invention, enables to generate an output gaseous stream at a constant temperature, unlike the single tank system which inevitably undergoes temperature changes while heat is stored or recovered. The multi-chamber system is controlled by a system controller to generate an output gas stream from the multi-chamber STES system at a constant temperature by mixing the streams from the chambers that are at different temperatures from 600° C. to 800° C.

The immiscible gaseous HTF transfers heat by gas bubbling in direct contact heat transfer with the molten salt liquid layer in high heat transfer rates. This heat transfer method obviates the need of a heat exchanger between the hot gaseous HTF stream from the power tower receiver and the heat storage medium of corrosive molten salt liquid. This is a great saving on the installation cost for the CSP plants, because such heat transfer operation usually requires a large heat transfer area. For example, the dual-purpose heat exchanger for both heat charging and discharging between the synthetic oil HTF and the heat storage medium of solar salt liquid requires a heat transfer area of around 28,000 square meters for the parabolic trough CSP plant having an electricity generation capacity of 100 MWe with a thermal storage capacity of 7.4 hours.

An example of such molten eutectic salt liquid is a binary mixture of $Li_2CO_3$—$Na_2CO_3$ where a eutectic composition develops with 44.3 wt. % of $Li_2CO_3$ at the melting temperature of 495.8° C. This eutectic mixture exhibits liquidus and solidus equilibrium lines with 100 mol % of $Na_2CO_3$ which melts at 858° C. and with 100 mol % of $Li_2CO_3$ which does at 723° C. Especially, the molten carbonate salt, in this case, becomes thermally stable with the $CO_2$ gas as an immiscible HTF at temperatures up to 1000° C., so it can be used as a stable TES material in the service conditions.

The $CO_2$ gas is the most efficient heat transfer medium compared to other candidates such as He, $N_2$, and air due to its high molecular weight, which helps reduce the size of gas compressor. However, due to the low volumetric heat content of the gaseous $CO_2$, still very large volumetric flow rates are required when it is used as a HTF. Therefore, this $CO_2$ gas bubbling STES system will be useful for the electricity generation of the lower capacities.

For an operating pressure of 20 bar, for example, the generation capacity of up to 20 MWe will be practically feasible because it will require a reasonable installation cost by using the commercially available pipes for the plant such as for the risers and downcomers of the power tower receiver and also the process transfer lines. Also, the system can be manufactured as a modular unit reducing the installation cost and construction time. The capacity of 20 MWe is appropriate to support about 5,000 families with a population of 20,000. According to the 2000 census, about 7.1 percent of all townships in the U.S. had as many as 10,000 inhabitants, and 52.4 percent fewer than 1,000 inhabitants. Therefore, on average in the U.S., a CSP plant in a size of 20 MWe could be used for about two townships up to 20 townships.

The embodiment of this invention converts the thermal energy of low heat capacities of about 12 J/L·° C. for a $CO_2$ gas at 900° C. and 20 bar to a dispatchable energy form of high heat capacities of about 4000 J/L·° C. for the molten salt of $Li_2CO_3$—$Na_2CO_3$ used in this invention, and enables to supply the immiscible gaseous HTF at 700° C. or higher for power generation whenever necessary such as during the disturbances in solar irradiation or in the night.

The decomposition of the molten carbonate salts, the major problem of the salts in such applications, is prevented by maintaining the $CO_2$ partial pressure above the decomposition pressures. The corrosion problems of the carbonate molten salts, even though they are milder than the chloride or fluoride salts, can be mitigated by coating with a material such as aluminum for the TES tanks and the process equipment units. For the process equipment having complex internals where the coating is an unrealistic approach, the high nickel alloys must still be used.

The first embodiment of this invention, the multi-chamber STES system with the $CO_2$ gas used as an immiscible HTF, has many advantages for the lower electricity generation capacities; (i) The STES system such as those of an electricity generation capacity of 20 MWe at operating pressure of 20 bar, for example, is a practical process for CSP plants serving the communities having about 5,000 families with a population of 20,000; (ii) Since the heat transfer takes place by gas bubbling while the corrosive salt compounds are confined only in the STES chambers, this multi-chamber system needs a minimum effort for the maintenance required by the corrosion; (iii) Since the system uses a $CO_2$ gas as a HTF which does not freeze in the normal ambient temperatures, intimate maintenance is possible for the process components enabling to achieve a longer plant life even with a limited technical service at the remote and isolated locations; (iv) Modular plants can be manufactured with lower investment cost and construction time; (v) The system can be readily scaled up to larger capacities compared to other conventional TES systems such as the heat exchanger or encapsulated PCM types; (vi) The methods to mitigate the corrosiveness have been well studied.

The second embodiment of this invention utilizing a multi-chamber STES system with a molten salt liquid of eutectic mixtures as a TES medium and also as a HTF is further described below.

The multi-chamber STES system in a sequence operation yields the high heat storage and recovery efficiencies because no streams at different temperatures are mixed during the heat transfer operation. Such operation also requires about a half of the total storage volume as compared with that of the two tank system of the solar salt operating at the power tower receiver exit temperature of 565° C. For example, a multi-chamber system having six chambers with one chamber of them provided as an empty one in a sequence operation can reduce the total storage volume by 40% when compared with the two tank system. This multi-chamber STES system is also more practical and efficient than the thermocline tank system or the single tank system that has a horizontally floating partition panel; they have not been successful for commercial application where the maximum storage temperature is 565° C.

The multi-chamber system with a molten carbonate liquid used as a HTF in this embodiment is operating by a system controller such that an empty chamber is made available among a plurality of chambers, when the multi-chamber system is charged or discharged. In the daytime, for example, when a thermally discharged chamber is being charged, a cold liquid at 600° C. is withdrawn from the discharged chamber, heated by a power tower receiver to 800° C., and returns to the empty chamber. When the empty chamber is filled completely with the hot liquid at 800° C., the current discharged chamber where the cold liquid has been withdrawn becomes empty at the end of the cold liquid withdrawing step and starts to receive the hot liquid from the power tower receiver that originated from the next discharged chamber at 600° C. Such sequence operation continues while all chambers in the multi-chamber system except an empty chamber are completely charged with the hot liquid at 800° C. during the daytime. In the nighttime when the thermally charged chamber is discharging, a hot liquid at 800° C. is withdrawn from the charged chamber, cooled in a heat recovery exchanger to 600° C., and returns to the empty chamber. When the empty chamber is filled completely with the cold liquid at 600° C., the current charged chamber where the hot liquid has been withdrawn becomes empty at the end of the hot liquid withdrawing step and starts to receive the cold liquid from the heat recovery exchanger that originated from the next charged chamber at 800° C. Such sequence operation continues while all chambers in the multi-chamber system except an empty chamber are fully discharged during the nighttime. This sequence operation ensures that no mixing of streams at different temperatures takes place and that very high heat storage and recovery efficiencies can be achieved with a minimum loss of the available work.

With an empty chamber being made available to receive a hot or a cold stream originating from another chamber among a plurality of chambers, the total volume of the multi-chamber STES system can be reduced to almost a half of the combined volume of the hot and cold storage tanks in the solar salt TES system. Since, at the high service temperatures around 800° C., the tensile strength of the metal plates becomes significantly lower, it forces to build multiple small tanks instead of a single large tank such as the one having a diameter of 40 meters. The reduction of the total STES volume by about a half in this invention compared with the two tank storage system of the solar salt is a great advantage in the effort by the solar utility industry to lower the cost for electricity generation from the solar energy below the current price of $0.07 per KWH from the fossil fuels.

For the multi-chamber STES system, the molten eutectic carbonate salts can be used as a TES material and also a HTF. As an example, the eutectic binary mixture of $Li_2CO_3$—$Na_2CO_3$ is used as a TES medium and also as a HTF. In this case, the molten salt liquid is made intimately mixed with the $CO_2$ gas in order to keep the partial pressure of the $CO_2$ gas higher than the decomposition pressure which is mostly much lower than the atmospheric pressure. Therefore, all molten salt liquid lines and the molten salt layers in the chambers are provided with the $CO_2$ gas injection. The $CO_2$ gas evenly dispersed in the molten salt liquid lines and the liquid layers in the chambers ensures that the sufficient partial pressure of $CO_2$ is maintained to prevent decomposition of the carbonate salts. In this system, since a pure $CO_2$ gas is injected to make a few vol. % of $CO_2$ gas in the gas-liquid mixture, the full system pressure is the partial pressure acting on the dissociation reactions of the molten carbonate salts. Therefore, the normal system pressure of this system is always high enough to prevent dissociation of the molten carbonate salt. All $CO_2$ gas injected into the liquid lines collects in the headspaces of the chambers, where the gas is withdrawn, cooled, compressed, heated, and injected back into the system. Since the $CO_2$ gas does not participate in any reactions, there will be no net consumption and therefore the total flow rate of the circulating $CO_2$ gas is maintained at a minimum.

The second embodiment of the multi-chamber STES system of this invention with the molten carbonate salt used as a HTF has many advantages for the larger electricity generation capacities; (i) The STES system is simple to operate while achieving very high heat storage and heat recovery efficiencies with the minimum loss of the available work at the operating temperatures of the thermodynamic cycle engines up to 800° C.; (ii) The molten eutectic salt of $Li_2CO_3$ and $Na_2CO_3$ is stable in $CO_2$ atmosphere up to 1000° C.; (iii) The molten salts of $Li_2CO_3$ and $Na_2CO_3$ are the mildest in corrosiveness among the candidates, and the methods to mitigate the corrosiveness has been well studied; (iv) The multi-chamber STES of the second embodiment reduces the total storage volume to almost one half of the two tank system that is being used presently for the molten solar salt system at 565° C.; (v) The multi-chamber STES system conforms in concept to the requirements that the smaller tanks of around 10 to 15 meters in diameter are more feasible than the larger tanks at service temperatures above 700° C. due to the lower tensile strength of metals.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The article "a" is intended to include one or more items, and where only one item is intended the term "one" or similar language is used. Additionally, to assist in the description of the present invention, words such as top, bottom, upper, lower, front, rear, inner, outer, right and left are used to describe the accompanying figures. The terminology includes the words above specifically mentioned, derivatives thereof, and words of similar import.

Figure 1:
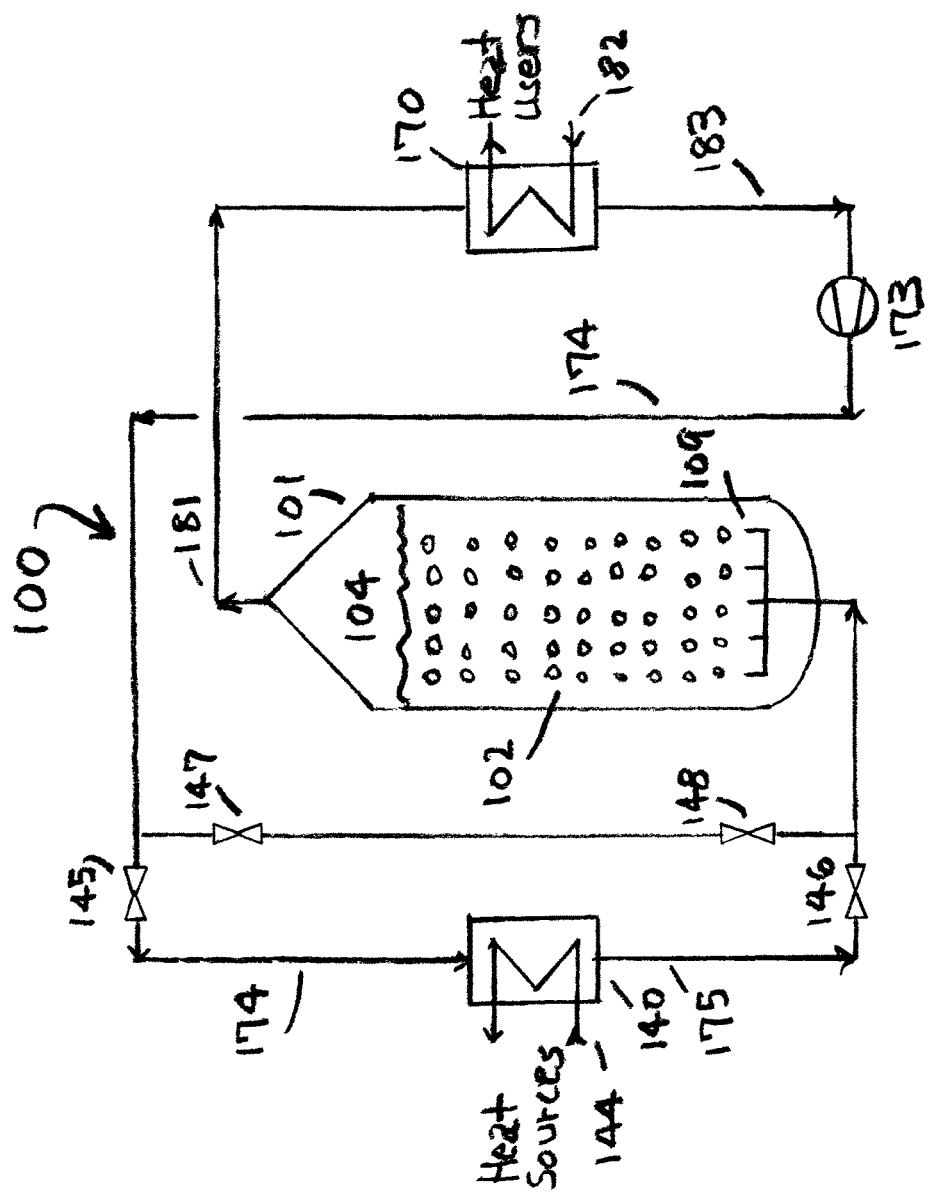
FIG. 1 is a schematic flow chart of a single STES tank with a molten eutectic salt liquid used as a TES medium and with an immiscible gas as a gaseous HTF for direct contact heat transfer of the prior art.

A single tank STES system 100 is illustrated in FIG. 1 that uses an inert gas as an immiscible HTF. The system is comprised of STES tank 101, hot gas bubbling nozzle 109, heat recovery exchanger 170, gas compressor 173, and heat supply exchanger 140. STES tank 101 comprises molten salt liquid layer 102 and gas layer 104. Hot gaseous HTF stream 181 exits the tank and circulates through heat recovery exchanger 170 where the HTF is cooled while thermal energy in sensible heat is transferred to HTF stream 182 for heat users. Gaseous stream 183 from the heat recovery exchanger is then compressed by compressor 173, and compressed gas stream 174 heated in heat supply exchanger 140 by HTF stream 144 from the heat sources, and the heated stream 175 returns to hot gas bubbling nozzle 109 in STES tank 101 to generate hot gas bubbles. The hot gas bubbles heat up the liquid layer 102. System 100 can operate in two modes; the first is an operation at constant temperature with a continuous supply of thermal energy and the second an operation at varying temperatures with an intermittent supply of thermal energy. Valves 145 and 146 are opened and 147 and 148 closed while the heat sources are operating, and valves 145 and 146 are closed and 147 and 148 opened while the heat sources are out of operation.

In the constant temperature mode of operation, the heated stream 175 is maintained at a constant temperature and constant flow rate. Thermal energy to heat the stream may be supplied from more than one source. At the same time, thermal energy is discharged to the heat users at a constant temperature and constant flow rate. In this case, the thermal energy may be discharged to more than one heat user. The exit gas stream from the heat recovery exchanger is compressed for circulation. The compressed gas is then sent to the heat supply exchanger to be heated.

In the varying temperature mode, the heat sources are changing in the heat supply rates which will cause changes in the temperature of heated stream 175 and subsequently the temperature of liquid layer 102. The exit gas stream 181 from tank 101 also changes in temperature, and makes it difficult to achieve a stable operation for the heat users. In case when the fluctuations in the heat sources are not severe, system 100 may be designed to provide with enough cushion so that the heat users can operate in the acceptable range of deviation from the optimum condition. However, when the fluctuations of the heat sources are severe or the heat supply from the heat sources is intermittent with unacceptable time gaps, then the single tank system such as shown in FIG. 1 is not appropriate for use in such applications as for the electricity generation that requires a stable operation for the thermodynamic cycle engines.

Figure 2:
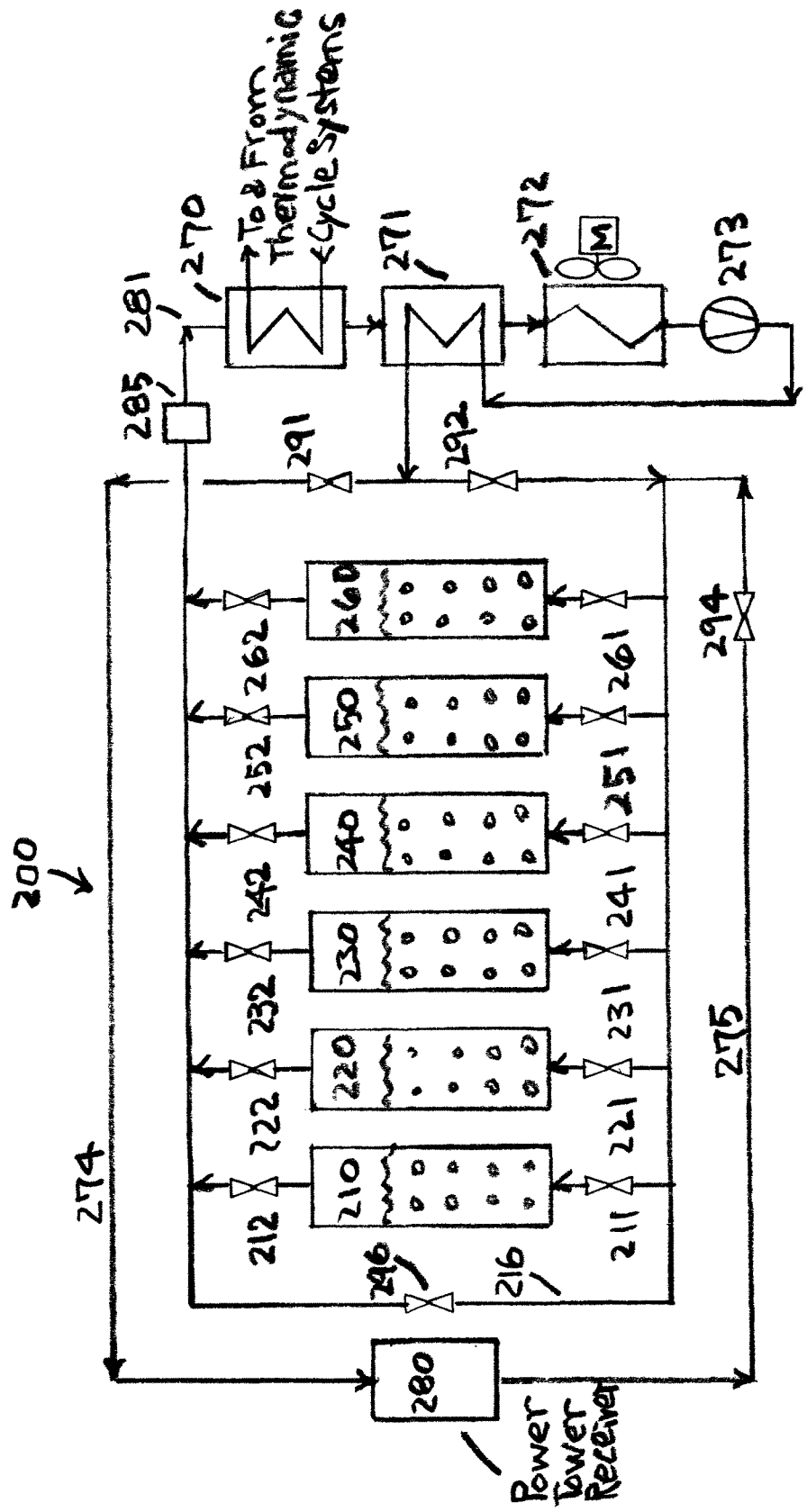
FIG. 2 is a schematic flow chart of a process for a multi-chamber STES system with a molten eutectic salt liquid used as a TES medium and with an immiscible gas as a gaseous HTF for direct contact heat transfer.

The first embodiment of this invention in FIG. 2 shows a multi-chamber STES system for charging and discharging thermal energy from a power tower receiver using an immiscible gaseous HTF. The system converts a form of thermal energy of low volumetric heat capacity at temperatures near 900° C. to a form of dispatchable energy of high volumetric heat capacity at temperatures above 600° C. For this purpose, the process uses a gaseous HTF that is heated up to a temperature around 900° C. by a power tower receiver, and contacted by gas bubbling with the molten eutectic salt layer to store the thermal energy at 800° C. at an optimum system operating pressure. While the individual chambers are cooled from 800° C. to 600° C. in the heat discharging steps, the multi-chamber system as a whole generates an output gas stream at a constant temperature of 700° C. In practice, the operating pressure and temperature for the system are determined by a trade-off analysis.

Circulating gaseous HTF stream 274 must be inert to the components of the molten salt liquid, remain stable, and have as good heat transfer capability as possible in the service conditions. The gases such as He and $CO_2$ have been used as a coolant in nuclear power plants where service temperatures approach near 700° C. and pressures higher than 30 bar. A tubular type power tower receiver, on the other hand, can heat air to above 800° C. or liquid HTF above 600° C. at high pressures as indicated by Ho and Iverson (2014).

During daytime while solar irradiation is available, process 200 in FIG. 2 works to supply thermal energy from power tower receiver 280 to STES chambers 210, 220, 230, 240, 250 and 260 to store heat and also to the power block through heat recovery exchangers 270 for generation of electricity. The power block is a thermodynamic cycle system selected from a group comprising a supercritical steam Rankine cycle, a $sCO_2$ Brayton cycle, an air Brayton cycle, a conventional steam Rankine cycle, a parabolic disc with a thermodynamic cycle engine, an organic Rankine cycle (ORC) and combinations thereof. The types of thermodynamic cycle engine for the parabolic disc includes kinematic Sterling engines, free-piston Stirling engines, and Brayton turbine-alternator based engines. The gaseous HTF stream then passes through recuperator 271 and air cooled exchanger 272 having a motored fan, where it is cooled to a temperature low enough for efficient compression. A gaseous HTF compressor 273 circulates the gas stream at a constant flow rate required to generate the design capacity of electricity by the thermodynamic cycle system. The compressed gas is then heated again by recuperator 271 to as high temperature as possible, and sent to power tower receiver 280. Valve 292 remains closed during the charging period. Valve 212, 222, 232, 242, 252, and 262 close the exit stream from STES chamber 210, 220, 230, 240, 250, and 260, respectively, while valve 211, 221, 231, 241, 251, and 261 control the gas flow rate of the inlet stream to the respective chamber. Device 285 is installed in front of heat recovery heat exchanger 270 in order to remove the liquid particles possibly entrained in the gaseous HTF stream.

The STES chambers operate between 600° C. and 800° C. At the start of the charging step, all STES chambers are at a temperature of 600° C. Therefore, the temperature of stream 281 is made to be 700° C. by mixing the streams consisting of bypass stream 216 being at a temperature much higher than 700° C. and the streams from any of the STES chambers which are at 600° C. At this time, bypass valve 296 is opened. At the full energy charge, all chambers reach 800° C. at the eutectic composition of the molten salt liquid, whereas at the full discharge, the liquid layer temperature decreases to 600° C. at the same liquid concentration. The temperature 700° C. of the outlet gas stream from the multi-chamber STES system is the midpoint, as denoted by point C in FIG. 3, between 600° C. and 800° C. For the last STES chamber during the charging step, once its temperature reaches 700° C., there is no other heat source to generate a colder gas, so the temperature of the gas stream must increase continuously until it reaches 800° C. the final design temperature in the charging step or the temperature the power generation system can tolerate.

The operation method of the process in FIG. 2 during the daytime is as follows: (i) A constant temperature of 700° C. and a constant $CO_2$ flow rate for the feed stream to the heat recovery exchanger are maintained to generate the design capacity of electricity by the thermodynamic cycle system; (ii) In the beginning of the charging step, the bypass stream at above 800° C. and the streams from any combinations of the STES chambers at 600° C. are mixed in order to make the feed stream to the heat recovery exchanger to be at 700° C.; (iii) In the beginning of the charging step, the first STES chamber is charged up to 800° C. as soon as possible in preparation for the disturbances of solar irradiation; (iv) In the beginning of the charging step, once the first STES chamber reaches 800° C., the bypass valve is closed and the whole gas flow passes through the STES chambers which are between 600° C. and 800° C.; (v) During normal operation, a constant temperature for the gas stream to the heat recovery exchanger is achieved by mixing the gas streams from any combination of the STES chambers being at temperatures between 600° C. and 800° C.; (vi) During the time of disturbance of solar irradiation, when the temperature of the current STES chamber decreases below 700° C. because the temperature of the stream from the power tower receiver is below 700° C., start the gas flow to the previous chamber that is at 800° C. and mix the streams from the current and previous ones to make the outlet gas stream from the multi-chamber STES system to be at 700° C.; and (vii) For the last STES chamber in the charging step, continue charging even after its temperature reaches 700° C., while the gas temperature to the heat recovery exchanger rises to 800° C. because there is no chamber whose temperature is lower than 700° C.

The gas temperature is lowered to an economical temperature in recuperator 271 and cooled further in air cooled exchanger 272 to such a temperature as compressor 273 can operate with the optimum power consumption. Gas stream 274 having been re-heated in recuperator 271 is then sent to power tower receiver 280. The heated gas stream 275 is sent to the STES chambers.

During the nighttime while the solar irradiation is absent, the STES chambers discharge thermal energy for the thermodynamic cycle system to continuously generate the design capacity of electricity. At this time, valves 291 and 294 are closed, and valve 292 is opened. At the start of the discharging step, all STES chambers are at a temperature of 800° C. Therefore, the temperature of stream 281 is made to be 700° C. by mixing the streams consisting of bypass stream 216 being at a temperature much lower than 700° C. and the streams from any of the STES chambers which are at 800° C. At this time, bypass valve 296 is opened. Each STES chamber discharges thermal energy until the liquid temperature reaches 600° C. In a normal operation, no STES chambers are cooled below 600° C. in order to have a safe margin of temperature to prevent freezing of the molten salt liquid. For the last STES chamber, once its temperature reaches 700° C., there is no other heat source to generate a hotter gas, so the temperature of the gas stream must decrease continuously until it reaches 600° C. the final design temperature in the discharging step or the temperature the power generation system can tolerate. In the next morning with the solar irradiation available, all STES chambers start at a temperature of 600° C.

The operation method of the process in FIG. 2 during the nighttime is as follows: (i) A constant temperature of 700° C. and a constant gaseous HTF flow rate for the feed stream to the heat recovery exchanger are maintained to generate the design capacity of electricity by the thermodynamic cycle system; (ii) In the beginning of the discharging step, the bypass stream being at a temperature much lower than 700° C. and the streams from any combination of the STES chambers at 800° C. are mixed in order to achieve 700° C. for the outlet gas stream from the multi-chamber STES system; (iii) When the first STES chamber reaches a temperature below 700° C., stop the bypass flow by closing the bypass valve and start the gas flow to the next chamber which is at 800° C., and then mix the two streams from the current and next ones to make the outlet gas stream from the multi-chamber STES system to be 700° C.; (iv) For the last STES chamber in the discharging step, the temperature of the gas stream to the heat recovery exchanger keeps decreasing to 600° C., because there is no chamber whose temperature is above 700° C.

The multi-chamber STES system is controlled by a system controller for the following process control scheme; (i) The output stream must be provided at the predetermined constant temperature at the start of the charging step even though all chambers are in the fully discharged state at the lowest storage temperature; (ii) The system must respond to the disturbances in solar irradiation with a response time as short as possible; (iii) During the normal operation in the daytime as well as in the nighttime, the streams from the selected chambers are mixed to generate an output stream from the system at the predetermined constant temperature and flow rate; (iv) The output stream must be provided at the predetermined temperature at the start of the discharging step even though all chambers are in the fully charged state at the highest storage temperature.

In thermal connection with the multi-chamber STES system, a supercritical steam Rankine cycle or a sCO$_2$ Brayton cycle can generate electricity utilizing such thermal energy in a separate system at operating temperatures above 600° C. with cycle efficiencies near 50%. The major difficulty with a gaseous HTF for such applications, however, is its low volumetric heat capacity; the gaseous HTF requires very large volumetric flow rates to supply heat compared to the liquid HTF; it is also unable to provide even an instantaneous cushion for the variations of solar irradiation such as what is caused by the clouds. The multi-chamber STES system of this first embodiment is used to harness such high temperature solar energy resolving those difficulties. Also, unlike the power tower receiver run with the liquid HTF, the receiver with the gaseous HTF can eliminate the loss of the electricity generation time incurring, for example, due to its startup in the morning and shutdown in the evening and the blockage of the receiver tubes by the frozen salt plugs on windy days.

The multi-chamber STES system with a gaseous HTF can be used more advantageously for the lower electricity generation capacities, because, for the higher capacities, the installation cost becomes too high to justify the high installation and operating costs due to the unbearably high volumetric flow rates. Since the operating pressure determines the volumetric flow rates, the optimum plant capacity and operating pressure must be decided by a trade-off analysis.

In order to determine the storage temperature, many factors must be considered such as the thermal stability of the eutectic salt components, compatibility of the materials of construction and their costs, maintenance and operation costs, and the temperature level required for the thermodynamic cycle engine that generates electricity using the stored energy. In this embodiment, the storage temperatures have been set between 600° C. and 800° C. in order to utilize the sensible heat as much as possible while supplying the heat to the thermodynamic cycle system at 700° C. at which a supercritical steam Rankine cycle or a sCO$_2$ Brayton cycle can operate with the cycle efficiencies near 50%. In addition, the storage system of this embodiment provides a cushion against the variations of solar irradiation with a short response time, less than a minute to recover the normal operating temperature of 700° C., with a capability of a dispatchable thermal storage capacity for as many hours as desired.

To determine the operating pressure, on the other hand, many factors must be evaluated as well such as the density of the gaseous HTF to increase the volumetric heat capacity, installation cost of storage tank, parasitic power consumption for the gas compressor, and design of the power tower receiver. The higher operating pressure will increase the volumetric heat capacity of the gaseous HTF, while increase at the same time the installation cost of the storage tank.

An example is illustrated for this invention with the eutectic binary salt of Li$_2$CO$_3$—Na$_2$CO$_3$ as a TES medium and a CO$_2$ gas as an immiscible gaseous HTF. Even though it was known that the molten carbonate salt is thermally unstable at the high temperatures of this service, it has been found that the eutectic ternary mixture of Li$_2$CO$_3$—Na$_2$CO$_3$—K$_2$CO$_3$ is very stable up to 1000° C. in a CO$_2$ atmosphere. Therefore, the Li$_2$CO$_3$—Na$_2$CO$_3$ binary system must be also thermally stable along with a CO$_2$ gas when the CO$_2$ gas is used as an immiscible HTF providing enough partial pressure to suppress the decomposition reactions. Normally, the system operates at much higher pressures than the decomposition pressures as explained in the following sections. Janz et al. (1979) reports the decomposition pressures for the following carbonate compounds.

TABLE 1

Decomposition Pressures at Service Temperatures

| System/Temperature | 600° C. | 800° C. |
|---|---|---|
| Li2CO3, Bar | $3.7 \cdot 10^{-5}$ | $1.6 \cdot 10^{-1}$ |
| Na2CO3, Bar | $3.7 \cdot 10^{-6}$ | $2.5 \cdot 10^{-3}$ |
| K2CO3, Bar | $2.0 \cdot 10^{-7}$ | $4.5 \cdot 10^{-5}$ |
| Li2CO3—Na2CO3, Bar | $6.4 \cdot 10^{-5}$ | $3.0 \cdot 10^{-2}$ |
| Li2CO3—K2CO3, Bar | $2.9 \cdot 10^{-6}$ | $2.6 \cdot 10^{-3}$ |
| Li2CO3—Na2CO3—K2CO3, Bar | $1.3 \cdot 10^{-3}$ | $3.0 \cdot 10^{-2}$ |

Another issue of the molten carbonate salts is their corrosiveness; however, much research has been made on their corrosion characteristics at high temperatures. For example, it was found that some high nickel alloys are very promising candidates for this application, but their costs are mostly several times higher than stainless steel. Aluminum coating is also known to be a promising alternative option for the services with a reasonable installation cost being about twice as much as the stainless steel as Glatzmaier and Gomez (2015) recently suggested.

As for the $CO_2$ gas, it is very stable at the service temperatures up to 1000° C. For example, the decomposition composition of a pure $CO_2$ gas at 1000° C. is 0.011% at 1 bar, 0.005% at 10 bar, and 0.0024% at 100 bar.

Material of construction for the $CO_2$ gas at high temperatures is also reported. For example, in the service temperatures below 450° C., low alloy, temperature resisting, ferric steels containing molybdenum, chromium, or both may be used; in the temperatures between 300° C. and 700° C., austenitic stainless steels; and in the temperatures up to 1000° C., Ni—Cr or Ni—Cr—Fe alloys.

Employing a gaseous HTF such as $CO_2$ gas obviates the necessity of the means to prevent freezing of the molten salt liquid and also of the high installation cost in case when the highly corrosive molten salts such as the chloride and fluoride compounds are used as a HTF in the process. The following table compares the desirable properties of the HTF suggested by Bauer et al. (2016, page 4) for the SunShot Initiative of the Department of Energy (D.O.E.) with those of the $CO_2$ gas.

TABLE 2

Comparison with the D.O.E. HTF Specifications

| Properties | D.O.E. Specifications | $CO_2$ Gas |
|---|---|---|
| Thermal Stability | >800° C. | up to 1000° C. |
| Specific Heat, J/g K | >3.0 (>3 KJ/L K) | 1.26 at 800° C. & 20 Bar (12.2 J/L K) |
| Melting Point, ° C. | <250 | −56.6° C. |
| Cost, $/Kg | 1 | <0.1 |

As expected, the $CO_2$ gas is superior in all aspects other than the volumetric specific heat; the volumetric specific heat of the gas is lower than the desired requirements, probably for a liquid HTF, by two orders of magnitude. Therefore, for a given electricity generation capacity, the gaseous HTF would require volumetric flow rates higher by two orders of magnitude compared with a liquid HTF. The analysis in this invention, as explained below in detail, reveals that the gaseous HTF can be used more advantageously for smaller installations, for example, a capacity below about 20 MWe at an operating pressure of 20 bar, possibly in remote and isolated locations, because the smaller plants with a gaseous HTF will be easier to operate and maintain with limited labor and technical support compared with the larger plants operating with a molten salt HTF. In addition, the smaller facilities can be built as modular plants reducing significantly the installation costs and construction time. The 20 MWe plant, for example, can support a community of about 5,000 families with a population of 20,000.

An example of the molten eutectic salt that can be utilized for the embodiment system explained above is the binary eutectic system $Li_2CO_3$—$Na_2CO_3$ with the $CO_2$ gas used as an immiscible gaseous HTF. The embodiment system is illustrated in FIG. 4, and the phase diagram of the binary eutectic system in FIG. 3. The eutectic point 3001 occurs at 44.3 wt. % of $Li_2CO_3$ at the temperature of 495.8° C. The liquidus line in the $Na_2CO_3$ rich side develops between the eutectic point and the point of 0% of $Li_2CO_3$ and 858° C. the melting temperature of $Na_2CO_3$, and the liquidus line in the $Li_2CO_3$ rich side between the eutectic point and the point of 100% of $Li_2CO_3$ and 723° C. the melting temperature of $Li_2CO_3$.

Figure 3:
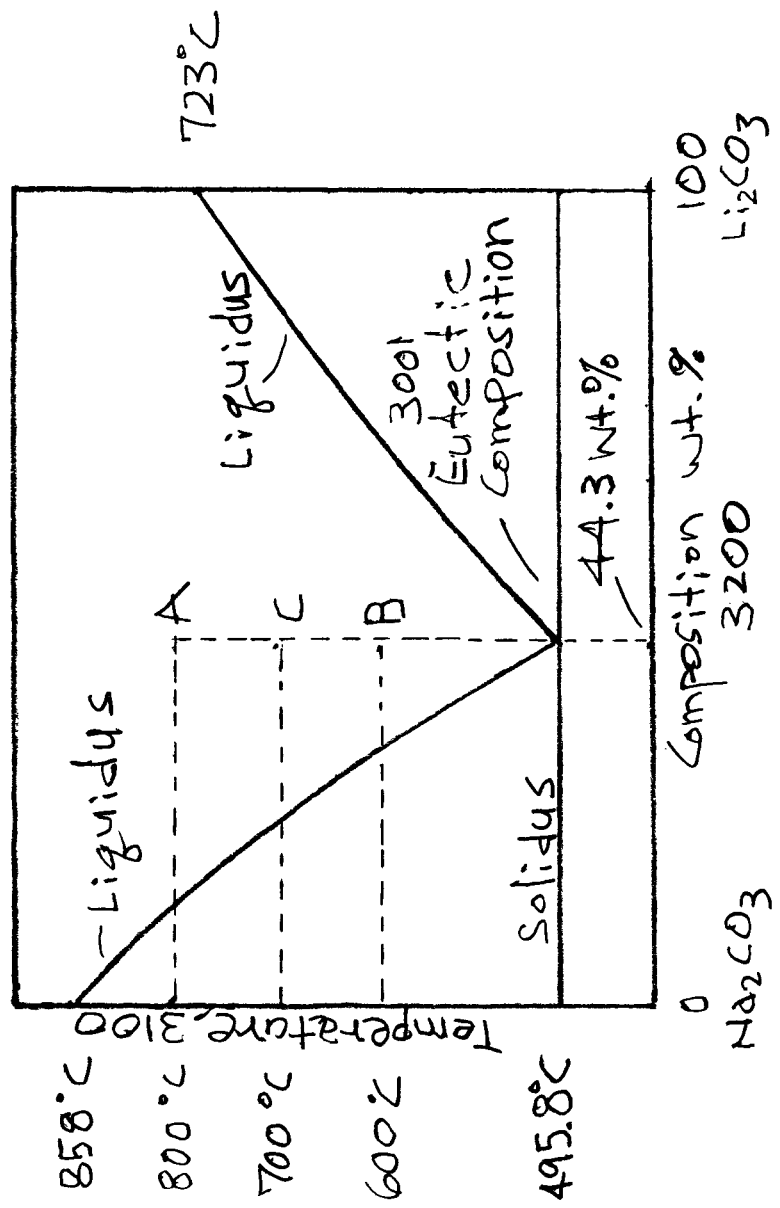
FIG. 3 is a phase diagram of $Li_2CO_3$—$Na_2CO_3$ system with the thermodynamic states of the operation depicted for the process of FIG. 4 of the prior art.
Figure 4:
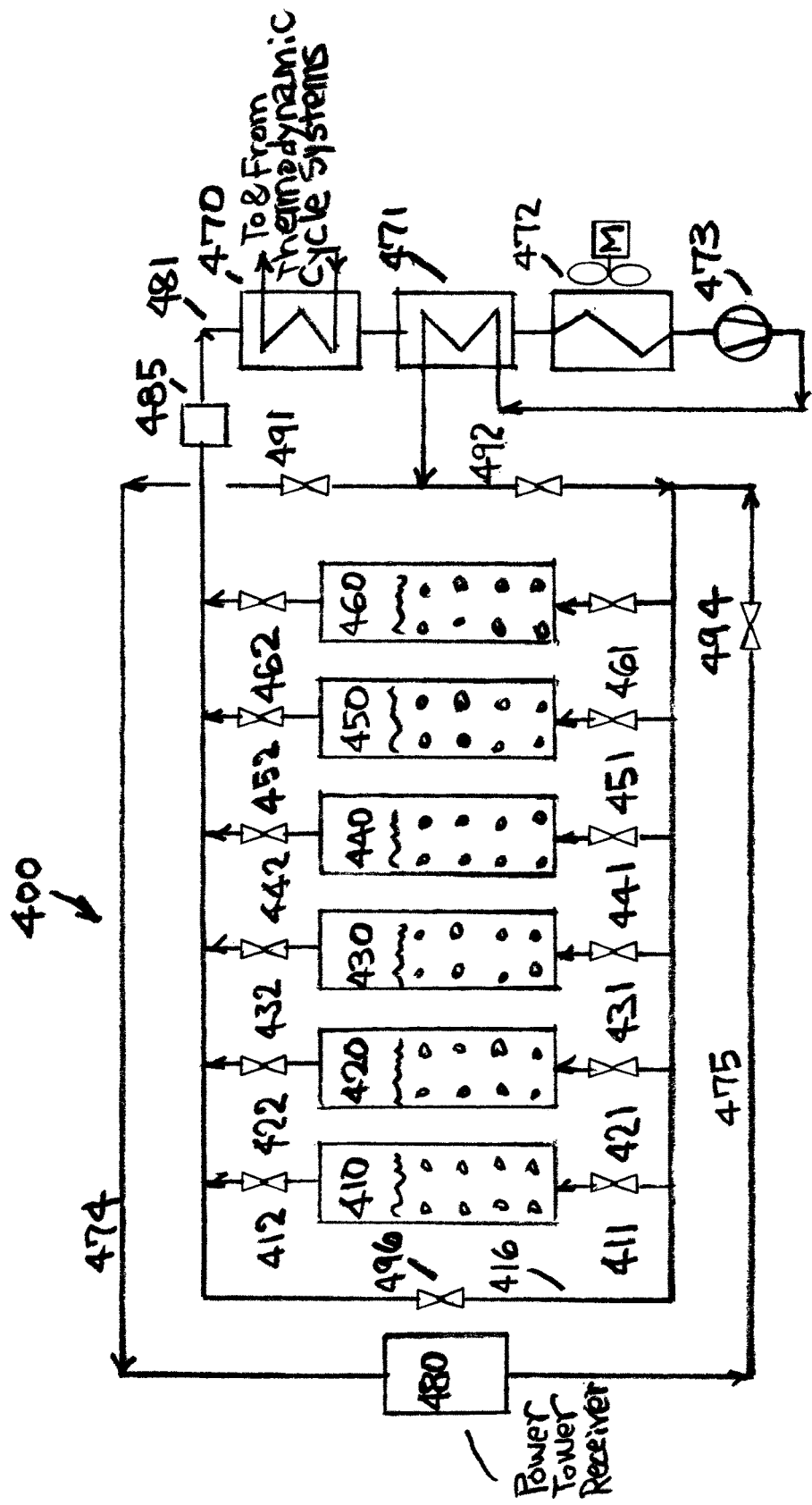
FIG. 4 is a schematic flow chart of a process for a multi-chamber STES system with a molten eutectic salt liquid of $Li_2CO_3$—$Na_2CO_3$ used as a TES medium and with a $CO_2$ gas as a gaseous HTF for direct contact heat transfer.

To illustrate the operation of the example system, an initial condition is chosen where the heat source has completed its heat supply step at the superheated liquid state A in FIG. 3 with the eutectic composition of 44.3 wt. % of $Li_2CO_3$ and the temperature of 800° C. During the heat releasing step, the thermodynamic state of the system moves down vertically, while discharging the stored thermal energy, with a fixed composition of 44.3 wt. % of $Li_2CO_3$ on composition axis 3200 following temperature 3100 until the liquid layer cools down to a temperature of 600° C. at point B in the figure. During the heat charging step, on the other hand, the liquid layer is heated up again to the temperature of 800° C. at the same concentration. By using the STES system in FIG. 4, thermal energy can be saved and then released by repeating this procedure.

During the period when the binary eutectic system of $Li_2CO_3$—$Na_2CO_3$ at a concentration of 44.3 wt. % of $Li_2CO_3$ is cooled from 800° C. to 600° C. with a temperature drop of 200° C., heat is discharged with an enthalpy difference on volume basis of 807 KJ/L, which is higher than 738 KJ/L of the solar salt when its sensible heat is discharged from 565° C. to 290° C. with a temperature drop of 275° C. Therefore, this molten binary carbonate salt system is a very effective heat storage media for STES for working temperatures above 600° C. The $CO_2$ gas stream from the multi-chamber STES system is fed into the heat recovery exchanger at a constant temperature of 700° C. throughout the operation in the daytime as well as in the nighttime except the last periods for charging and discharging steps.

In FIG. 4, the example system is illustrated with the last two digits of the item numbers being identical to those of FIG. 2 and with the first digit changed to 4 from 2. The equipment units having the identical last two digits are working in the same way for both the two systems 200 and 400. A $CO_2$ circulation compressor 473 in FIG. 4, during the daytime, circulates $CO_2$ gas stream 474 through power tower receiver 480, any combination of STES chambers 410 to 460 in parallel, heat recovery exchanger 470 for operation of the thermodynamic cycle system, recuperator 471 in both directions, and air cooled exchanger 472 while electricity is produced and the STES chambers are charged at the same time. During the nighttime while energy is discharged, $CO_2$ gas stream 474 passes through the STES chambers, heat recovery exchanger, recuperator, and air cooled exchanger, but not through the power tower receiver. As the compressor is the largest consumer of parasitic power in the process, a strategy for the most economic operation of the equipment is essential for the success of this utility plant. Normally, about 10% to 15% of the gross electricity production is used for such parasitic power consumption as for pumping in CSP plants, and such parasitic consumption must be minimized as much as possible as described in SunShot Vision Study by U.S. D.O.E. (2012).

The operating pressure of STES system 400 in FIG. 4 must be determined by optimizing the installation and operating costs of the system. The $CO_2$ gas can be heated up to a temperature of 900° C. at pressures around 20 bar by a cavity type tubular receiver. The STES chambers, however, must be designed only for limited ranges of pressure at the storage temperature of 800° C. in order to avoid an excessively high installation cost. The $CO_2$ gas compressor, on the other hand, requires the system pressure to be higher in order to keep the volumetric gas flow rate as low as possible for more efficient power consumption. The major factors affecting the installation and operating costs of the system are as follows; (i) Lower operating pressure is more favorable for the design and the installation cost of the STES chambers; (ii) Lower operating pressure is more favorable for the design and the cost of the power tower receiver; (iii) Higher operating pressure is more favorable for heat transfer due to the increased density of $CO_2$ gas and the increased volumetric heat capacity that make the volumetric flow rate lower resulting in lower pressure drop in the heat exchangers; (iv) Higher operating pressure is more favorable for the design of transfer piping, as lower volumetric flow rates reduce the friction losses and equipment sizes; (v) Higher operating pressure is more favorable for the design of compressor, because the lower volumetric flow rates owing to the higher pressure result in more efficient power consumption. Therefore, the optimum operating pressure must be determined by a trade-off study considering all the factors affecting the installation and operating costs of the system.

With the example system of this invention using the molten eutectic salt of $Li_2CO_3$—$Na_2CO_3$ as a TES medium and a $CO_2$ gas as a gaseous HTF, the compressor power requirements for adiabatic compression are calculated for electricity generation of 50 MWe at the system operating pressure of 10, 20, and 30 bar as illustrated in Table 3 using the equation below.

$$P_c = M_g[r/(r-1)](RT)[(P_o/P_i)^w - r]/3_c$$

where $w=(r-1)/r$

In the equation, Pc stands for compressor power in cal/s, Mg mass flow rate in Kg/s, r specific heat ratio (Cp/Cv), R gas constant in g-cal/g-mol·K, T temperature in K, Po compressor outlet pressure in bar, Pi compressor inlet pressure in bar, Cp specific heat at constant pressure, Cv specific heat at constant volume, and $3_c$ compressor efficiency.

TABLE 3

Compressor Power for 50 MWe with 7½ Hours of Storage

| Operating Pressure | 10 Bar | 20 Bar | 30 Bar |
| --- | --- | --- | --- |
| Suction Temperature, ° C. | 50 | 50 | 50 |
| Pressure Drop in Receiver, Bar | 1.5 | 1.5 | 1.5 |
| Pressure Drop in Chamber, Bar | 1.0 | 1.0 | 1.0 |
| Pressure Drop in Heat Exchangers | | | |
| Heat Recovery Exchanger, Bar | 0.3 | 0.3 | 0.3 |
| Recuperator for Both Directions, Bar | 0.6 | 0.6 | 0.6 |
| Air Cooled Exchanger, Bar | 0.3 | 0.3 | 0.3 |
| Pressure Drop in Piping, Bar | 0.3 | 0.3 | 0.3 |
| Total Pressure Drop, Bar | 4.0 | 4.0 | 4.0 |
| Power Consumption, MWe (1) | 16.2 | 9.2 | 5.8 |
| Riser, # of 24 inch pipe | 7.3 | 3.6 | 2.4 |
| Downcomer, # of 24 inch pipe | 36 | 6.3 | 4.3 |

Note:
1. Compressor efficiency of 90% was used.

From the table, it can be seen that the power requirements of the $CO_2$ gas compressor decrease while the system operating pressure increases. Also, the total power consumption for the compression at the operating pressure of 10 bar is around 30% of the net electricity production, which is too high to make an economic justification. Another factor to consider is the number of 24 inch pipe to be used for the riser and downcomer of the power tower receiver that are commercially available in the market. The use of the 24 inch pipe will be the most cost effective, because it is the largest standard size commercially available in high nickel alloys for the operating temperature of 900° C. and pressure of 20 bar. When a size lager than 24 inches is to be used at the same operating temperature and pressure, thicker pipe than the standard size of ½ inch thickness must be specially ordered, which will cause extra costs. Even though the total installation cost of the plant is not evaluated here, the cost will increase while the system operating pressure increases. Therefore, it is desirable to avoid the situation where the compressor power consumption becomes much higher than 15% of the gross power production and where more than several 24 inch pipes for the riser and downcomer must be used. Therefore, in terms of the power consumption, operating pressure below 10 bar is not desirable. Also, in terms of the number of the 24 inch pipe, the plant size for 50 MWe is too large, so the lower capacities are preferred.

In Table 4, the necessary power consumption of the gas compressor and the number of the 24 inch pipe are tabulated at the operating pressure of 20 bar for the net electricity generation capacities of 10, 20, 30, 40 and 50 MWe. In terms of the criteria of the previous section, the 20 MWe looks appropriate, but other cases for 10 and 30 MWe need to be compared with each other based on the total investment cost. The capacity of 20 MWe is appropriate for about 5,000 families with a population of 20,000. According to the 2000 census, about 7.1 percent of all townships in the U.S. had as many as 10,000 inhabitants, and 52.4 percent fewer than 1,000 inhabitants. Therefore, on average in the U.S., a solar plant in a size of 20 MWe could support about two townships up to 20 townships.

TABLE 4

Compressor Power at 20 Bar with 7½ Hours of Storage

| Capacity | 10 MWe | 20 MWe | 30 MWe | 40 MWe | 50 MWe |
| --- | --- | --- | --- | --- | --- |
| Suction Temperature, ° C. | 50 | 50 | 50 | 50 | 50 |
| Pressure Drop in Receiver, Bar | 1.5 | 1.5 | 1.5 | 1.5 | 1.5 |
| Pressure Drop in Chamber, Bar | 1.0 | 1.0 | 1.0 | 1.0 | 1.0 |

TABLE 4-continued

Compressor Power at 20 Bar with 7½ Hours of Storage

| Capacity | 10 MWe | 20 MWe | 30 MWe | 40 MWe | 50 MWe |
|---|---|---|---|---|---|
| Pressure Drop in Heat Exchangers | | | | | |
| Heat Recovery Exchanger, Bar | 0.3 | 0.3 | 0.3 | 0.3 | 0.3 |
| Recuperator for Both Directions, Bar | 0.6 | 0.6 | 0.6 | 0.6 | 0.6 |
| Air Cooled Exchanger, Bar | 0.3 | 0.3 | 0.3 | 0.3 | 0.3 |
| Pressure Drop in Piping, Bar | 0.3 | 0.3 | 0.3 | 0.3 | 0.3 |
| Total Pressure Drop, Bar | 4.0 | 4.0 | 4.0 | 4.0 | 4.0 |
| Power Consumption, MWe (1) | 1.8 | 3.7 | 5.6 | 7.4 | 9.2 |
| Riser, # of 24 inch pipe | 0.9 | 1.4 | 2.2 | 2.9 | 3.6 |
| Downcomer, # of 24 inch pipe | 1.2 | 2.4 | 3.6 | 4.8 | 6 |

Note:
1. Compressor efficiency of 90% was used

For the evaluations in Table 3 and Table 4, the pressure drops for the heat exchangers and pipe were assumed to be those for the regular thermal process design. For the pressure drop of the chambers, a dispersed phase height of around 10 meters was assumed. For the power tower receiver, a more conservative value was assumed than the actual pilot plant test results where a pressure drop of 100-400 mBar was experienced with an air outlet temperature of 800-1000° C. at an operating pressure of 4-16 bar as explained by Hoffschmidt (2014). While the number of the multi-chamber STES system of this embodiment increases in actual deployment, the design can be improved such that the pressure drops are further minimized for the power tower receiver, heat recovery exchanger, recuperator and air-cooled exchanger. The lower pressure drop will enable the higher electricity generation capacities to be economically feasible. Especially, the modular plant manufacturing option will help reduce the installation cost and construction time making this system more favorable.

Most importantly, the gaseous HTF enables the direct contact heat transfer to be utilized in this application obviating the expensive heat exchangers. Additionally, it does not freeze in normal ambient temperatures unlike the molten salt HTF making the intimate maintenance possible for a longer plant life. Also, the $CO_2$ gas as an immiscible HTF obviates the need for parasitic utility expenses to prevent freezing of molten salt HTF, and additionally the loss of the electricity generation time, for example, for the startup by filling up the receiver with the molten salt liquid HTF in the morning, for the shutdown by draining the HTF from the receiver in the evening, and for resolving the problems arising from the frozen salt plugs in the receiver tubes on windy days.

A parabolic disc with a thermodynamic cycle engine has many advantages over other systems. Firstly, it has the highest efficiency for the solar-to-electricity performance among the CSP technologies when Stirling engines are used for electricity generation. Secondly, it can be used for the capacities from kilowatts to gigawatts. Thirdly, it can be manufactured by using the modular technology, making scale-up and manufacturing easier. Fourthly, it has showed the lowest water usage, because it can utilize a closed-loop cooling system such as for cars. Fifthly, it can be installed on uneven ground, making installation easier and less costly. However, for this particular system, the Sterling engines are costly, and the air Brayton cycles are investigated as an alternative. Also, electricity can be generated only during the daytime, since the thermal energy storage has been thought very difficult to be provided with. In connection with the STES system of this invention, however, the hot $CO_2$ gas can be used as a HTF to transfer thermal energy from the parabolic disc to the STES system in the daytime and in a reverse direction in the nighttime. Especially, the gaseous heat transfer medium enables the parabolic disc having a thermodynamic cycle engine to generate electricity in the night because the gaseous HTF never freezes unlike the molten salt liquid HTF.

The gaseous streams from the multi-chamber STES system may need a device to remove the entrained liquid droplets. The tendency of entrainment depends on the physical properties such as the gas velocity, density and viscosity and also the liquid density and particle sizes. Therefore, a sudden change of operating conditions such as the gas flow rates and operating temperatures and pressures can directly affect the possibility of entrainment. In order to ensure a safe operation, a means is needed prior to the heat recovery exchanger to trap such unexpected liquid particles.

Figure 9:
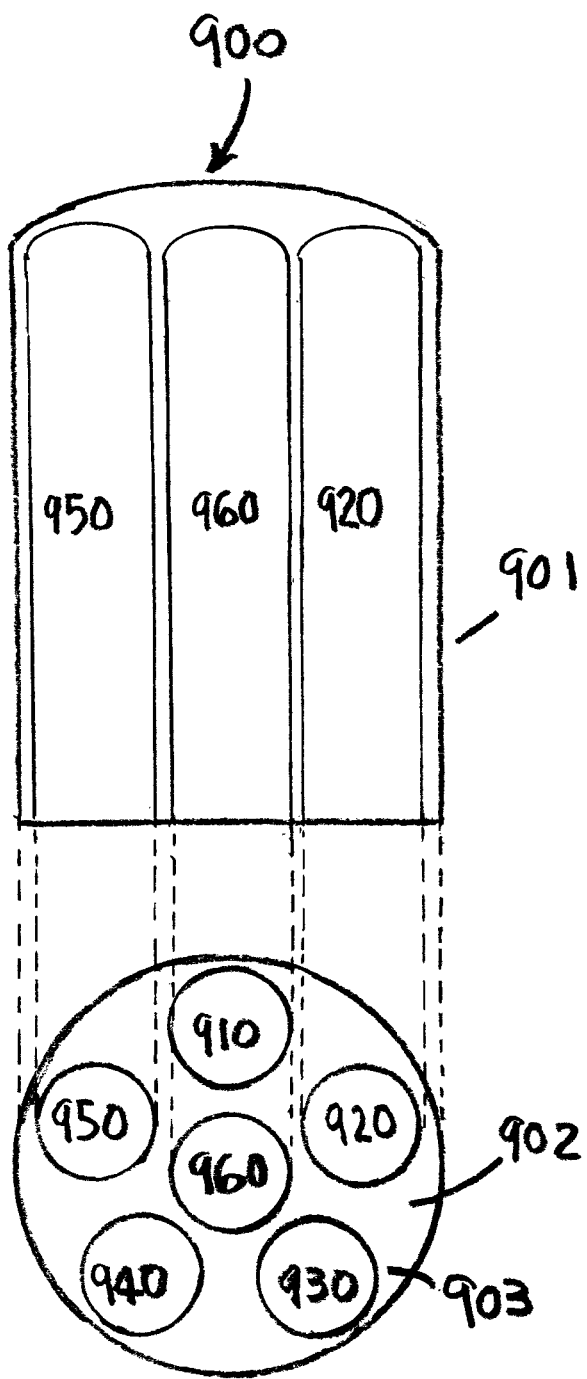
FIG. 9 is a schematic diagram of a physical configuration for a STES system with the multi-chambers housed in a tank for high operating temperatures and pressures.

The tank 901 as shown in FIG. 9 can be used for this application to house the multiple cylindrical chambers at high operating temperatures and pressures. For example, a typical STES tank of 40 meters in diameter for generation of 100 MW for a storage capacity of 7.4 hours can be readily divided into multiple cylindrical tanks while ensuring the least amount of heat losses to the atmosphere and the least friction losses owing to the shorter transfer piping. In addition, the space 902 between the outside walls of the chambers and the inside wall of the tank can be pressurized with a gas having low thermal conductivity. This pressure equalization enables to save installation costs owing to the thinner chamber walls, for example for the wall 903, and also to the insulating effects by the gas being filled in space 902.

The multi-chamber STES system with a $CO_2$ gas used as a HTF and a molten carbonate salt liquid as a TES medium of this invention has many advantages for the lower electricity generation capacities, for example, below 20 MWe at operating pressure of 20 bar; (i) The STES system is a practical process for CSP plants converting an energy form of very low volumetric heat capacity to a dispatchable form of very high heat capacity for the power tower receiver exit gas temperatures up to 1000° C.; (ii) The system operates between 600° C. and 800° C. generating the output gas stream at a constant temperature of 700° C. or higher, where the thermodynamic cycle engine such as a supercritical steam Rankine cycle or a $sCO_2$ Brayton cycle can be utilized to produce electricity at the cycle efficiencies close to 50%; (iii) The $CO_2$ gas as a HTF obviates the need of freezing protection in the CSP plants for other than the STES chambers; (iv) The carbonate compounds $Li_2CO_3$ and $Na_2CO_3$ are thermally stable up to 1000° C. in the $CO_2$ atmosphere; (v) A multi-chamber STES system makes it possible to keep the heat losses to the atmosphere to the minimum; (vi) A multi-chamber STES system makes it possible to use the least amount of the materials of construction for the chamber walls and the insulation materials by the pressure equalization with an inert gas; (vii) Bubbling is an effective method for heat transfer in such corrosive environment obviating the costly heat exchangers; (viii) The corrosive carbonate compounds $Li_2CO_3$ and $Na_2CO_3$ are confined only in the STES chambers, enabling to minimize the maintenance efforts required by the corrosion; (ix) The heat transfer medium $CO_2$ gas has the highest volumetric heat capacity among the candidate gases making it possible to operate the gas compressor, the highest parasitic energy consumer in the process, at the highest efficiencies; (x) The $CO_2$ gas as a HTF enables to eliminate the loss of the electricity generation time that would be incurred from the startup in the morning and shutdown in the evening of the receiver and also from the blockage of the receiver tubes by the frozen salt plugs on windy days in case when the molten salt liquid is used as a HTF.

Figure 5:
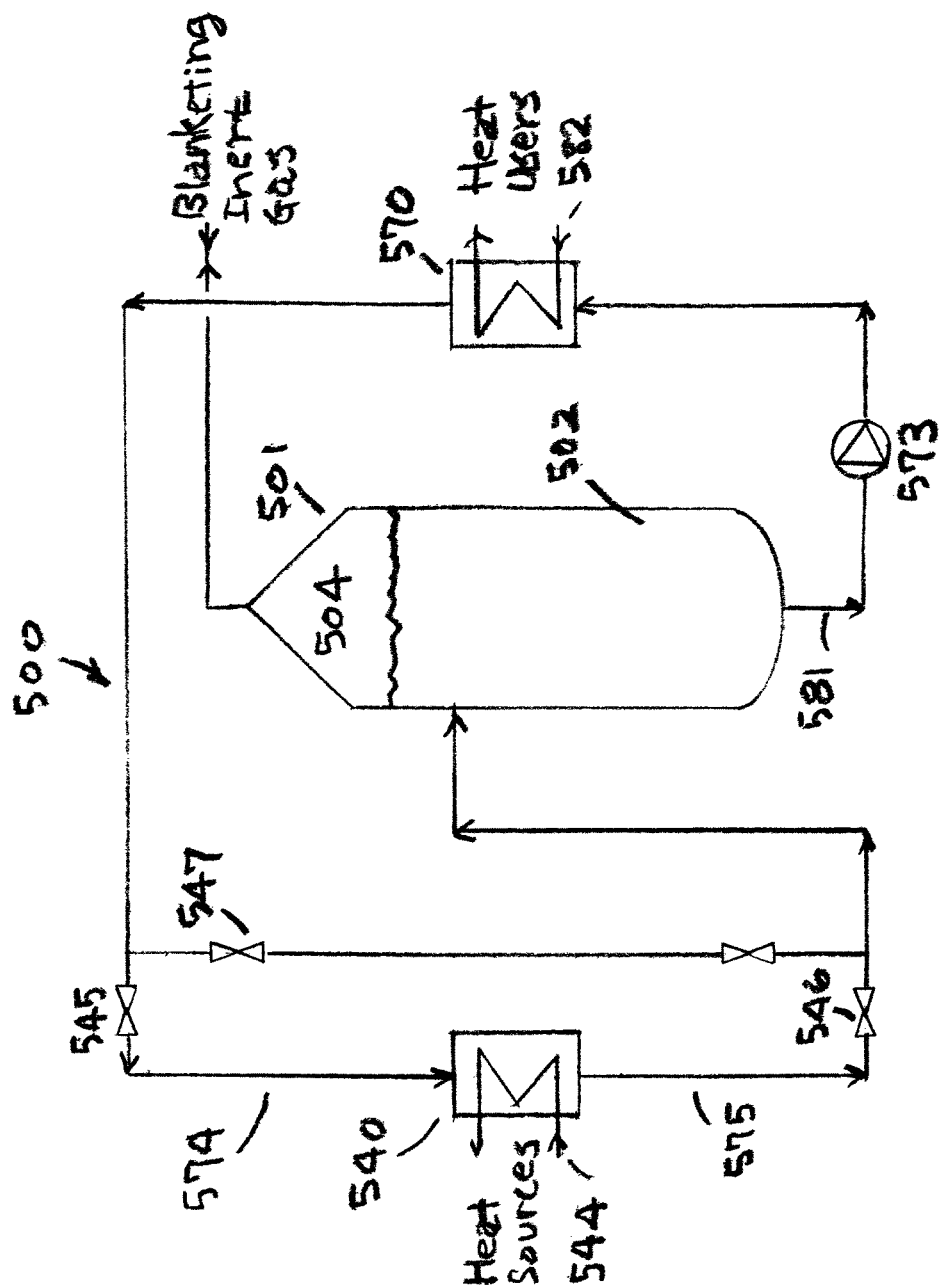
FIG. 5 is a schematic flow chart of a single STES tank with a molten eutectic salt liquid used as a TES medium and a HTF of the prior art.

In FIG. 5, a single tank STES system 500 is illustrated that uses a molten eutectic salt liquid as a TES medium and also a HTF. The system is comprised of STES tank 501, heat recovery exchanger 570, circulation pump 573, and heat supply exchanger 540. A single STES tank 501 comprises a molten salt liquid layer 502 and a blanketing inert gas 504 in the headspace. Hot molten salt liquid layer 502 is withdrawn, and the withdrawn liquid stream 581 circulates through heat recovery exchanger 570 where the molten salt HTF is cooled while thermal energy in sensible heat is transferred to HTF stream 582 for heat users. Cooled stream 574 is heated again in heat supply exchanger 540 by the HTF stream 544 from the heat sources, and the heated stream 575 returns to STES tank 501.

The single tank STES system as shown in FIG. 5 can be used reliably only with a continuous supply of thermal energy as explained for the system in FIG. 1. When the heat source undergoes fluctuations or is intermittent in heat supply, the temperature of the tank output stream fluctuates at the same time, which causes the operation of the thermodynamic cycle engines unstable. Therefore, in order to achieve a stable operation for the electricity generation, the multi-chamber STES system must be used as explained below.

Figure 6:
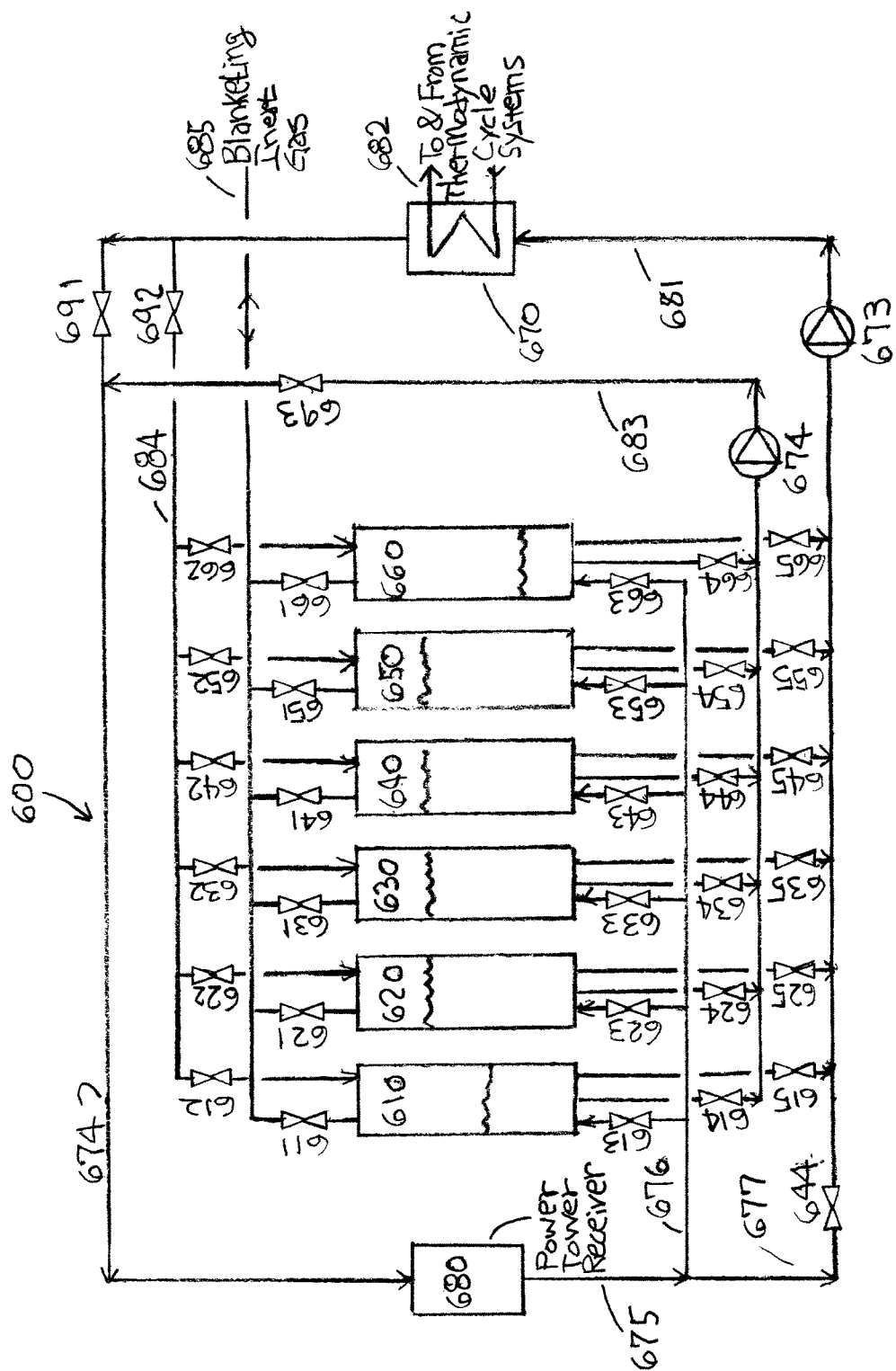
FIG. 6 is a schematic flow chart of a process for a multi-chamber STES system with a molten eutectic salt liquid used as a TES medium and a HTF.

For the second embodiment of this invention, a multi-chamber STES system with a molten eutectic salt liquid being used as a TES medium and also as a liquid HTF is illustrated in FIG. 6. The system is utilized for charging and discharging thermal energy from power tower 680. System 600 comprises chambers 610, 620, 630, 640, 650 and 660, heat recovery exchanger 670, power tower receiver 680, heat recovery pump 673, and heat storage pump 674.

During the daytime, system 600 supplies thermal energy to the thermodynamic cycle systems for generation of electricity and also charges heat to the TES chambers. At this time, valves 644, 691 and 693 are opened and valve 692 is closed. Two pumps 673 and 674 work simultaneously; pump 673 for electricity generation and pump 674 for heat storage. Pump 673 circulates the molten salt liquid through heat recovery exchanger 670, and pump 674 from one of the chambers containing cold liquid, for example, from chamber 610 by opening valves 611 and 614 and closing valves 612, 613 and 615. The two streams combine, and the combined stream 674 is heated by solar power tower receiver 680, and then divides into stream 676 and 677. Stream 676 is fed by opening valves 661 and 663 and closing valves 662, 664 and 665 into chamber 660 which has remained empty to receive this hot stream from the power tower receiver. Another stream is circulated by pump 673 to supply thermal energy to the thermodynamic cycle systems. When chamber 660 is full, chamber 610 will become empty to receive another batch of hot liquid by opening valve 613 and closing valve 614 from the power tower receiver, which originated from one of the chambers containing cold liquid. At this time, valves 611 and 661 are opened and valves 612, 615, 662, 663, 664, and 665 are closed. This sequence operation continues until all chambers except the last empty one are filled with the hot liquid. The system controller can readily operate the multi-chamber system in order to achieve the heat storage and recovery efficiencies as high as possible, because mixing of fluids at different temperatures does not take place which otherwise would cause the inherent thermal inefficiencies. At the end of the daytime operation, all chambers but an empty one must be completely filled with the hot molten salt liquid.

The operation method of the process in FIG. 6 during the daytime is as follows: (i) In the beginning of the day, all chambers but an empty chamber are completely filled with the cold molten salt liquid at 600° C.; (ii) In the beginning of the day, the molten salt liquid of streams 675, 676, 677, 681 and 683 in the circulation lines is below 800° C. due to the heat losses during the night; (iii) In the beginning of the day, the molten salt liquid of stream 674 is below 600° C. due to the heat losses during the night; (iv) Start heat recovery pump 673 and heat storage pump 674 to heat circulating stream 675 to 800° C. by power tower receiver 680; (v) Start generation of electricity by the thermodynamic cycle engines using the heat from stream 681 at 800° C. in heat exchange with heat recovery exchanger 670; (vi) Receive the hot molten salt liquid at 800° C. exiting the power tower receiver into the empty chamber 660, for example, the hot molten salt liquid having originated from chamber 610 at 600° C.; (vii) When chamber 660 is completely filled with the hot molten salt liquid at 800° C. with chamber 610 becoming empty, receive another batch of the hot molten salt liquid at 800° C. from the power tower receiver in chamber 610, the hot molten salt liquid having originated from the next chamber at temperature of 600° C.; (viii) Continue to receive the hot molten salt liquid at 800° C. through the power tower receiver in the empty chamber in sequence, the hot molten salt liquid having originated from the chamber which had the cold molten salt liquid at 600° C. Continue the sequence operation until all chambers but an empty chamber are completely filled with the hot molten salt liquid at 800° C. at the end of the day; and (ix) When fluctuations occur in the heat supply from the power tower receiver such as those by clouds in a day, use the hot molten salt liquid at 800° C. from any of the thermally charged chambers to supply heat to the heat recovery exchanger at 800° C. The returning flow being at temperatures lower than 800° C. from the power tower receiver during the fluctuation is sent to the chamber where the liquid at 600° C. has been withdrawn. When the normal supply of heat resumes in the power tower receiver, the charged hot liquid is sent first to the chamber where the hot liquid at 800° C. was taken out during the fluctuations.

During the nighttime, electricity is generated in the same capacity as in the daytime. At this time, valve 692 is opened and valves 644, 691, 693 are closed. Heat recovery pump 673 continues to operate, while heat storage pump 674 remains stopped. The hot molten salt liquid at 800° C. in chamber 610, for example, is circulated by pump 673 by opening valve 615 and 662 and closing valves 612, 613 and 614 through heat recovery exchanger 670, and the exit stream 684 now being cooled to 600° C. is sent to the empty chamber 660 by opening valve 662 and closing valves 663, 664 and 665. At this time, valves 611 and 661 are opened. Once chamber 660 is full of the cold molten salt liquid at 600° C., close valves 662, 663, 664 and 665. Then, chamber 610 becomes empty to receive another batch of cold liquid at 600° C. by opening valve 612 and closing valves 613, 614 and 615 from the heat recovery exchanger, the cold liquid having originated from the next charged chamber at 800° C. This sequence operation continues by the system controller until all chambers but an empty one are completely filled with the cold molten salt liquid at 600° C. The operation method of this embodiment enables the multi-chamber TES system to achieve the high energy storage and recovery efficiencies with only about one half of the total storage volume of the two tank system that is presently used for the molten solar salt system at the maximum service temperature of 565° C.

For example, in the process of FIG. 6, the six chamber system with one of them used as an empty chamber in sequence operation utilizes five out of six chambers for thermal energy storage. Comparing with the two tank system of solar salt operating at 565° C., the six chamber system requires 60% of the total storage volume of the two tank system, enabling to save 40% of the total volume. The saving approaches 50% while the number of chambers increases.

The operation method of the process in FIG. 6 during the nighttime is as follows: (i) All chambers but an empty one have been filled with hot liquid at 800° C.; (ii) Continue to operate heat recovery pump 673, and stop heat storage pump 674; (iii) Withdraw hot liquid at 800° C. from chamber 610, for example, circulate through heat recovery exchanger 670, and send cold liquid at 600° C. to the empty chamber 660; (iv) When chamber 660 is completely filled with cold liquid at 600° C. with chamber 610 becoming empty, receive in chamber 610 the cold liquid at 600° C. from the heat recovery exchanger, the cold liquid having originated from one of the chambers which had the hot liquid at 800° C.; and (v) Continue this operation in sequence until all chambers but an empty one are filled with the cold liquid at 600° C.

Figure 7:
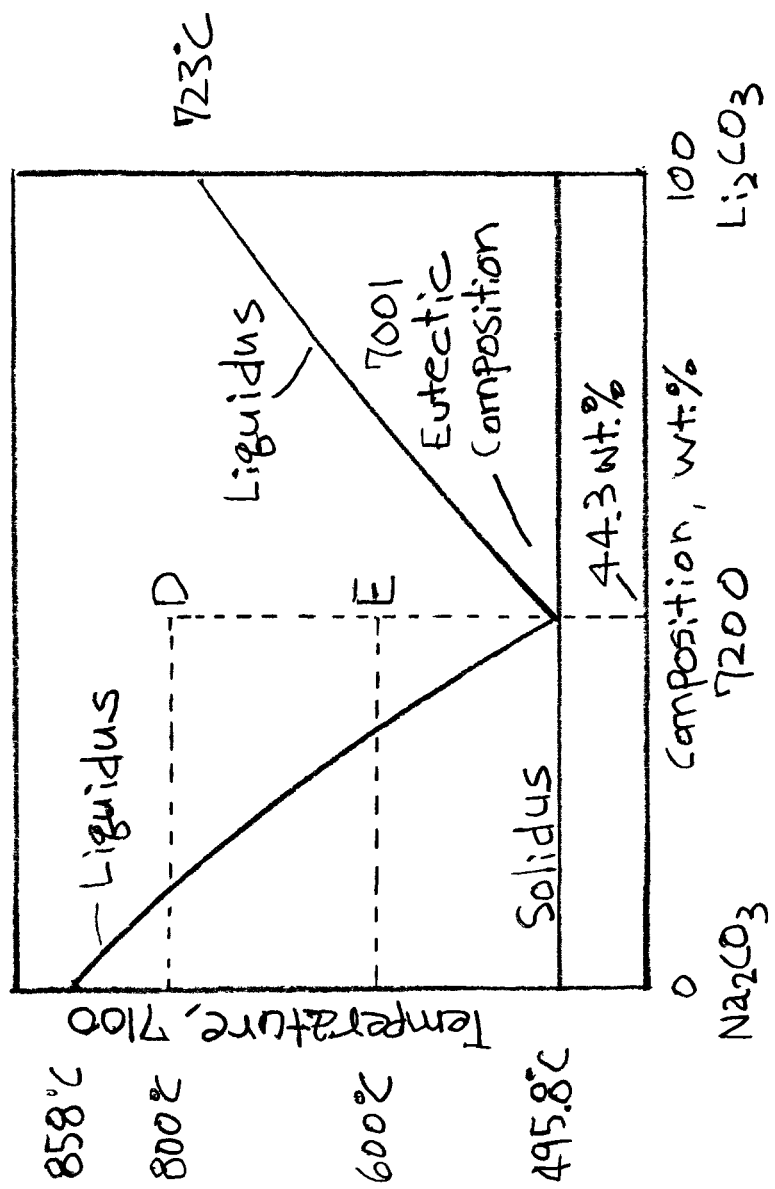
FIG. 7 is a phase diagram of $Li_2CO_3$—$Na_2CO_3$ system with the thermodynamic states of the operation depicted for the process of FIG. 8 of the prior art.

As an example of the operation of the multi-chamber STES system described above, a molten eutectic salt liquid of $Li_2CO_3$—$Na_2CO_3$ is employed as a TES medium and also a HTF. The phase diagram of the binary eutectic system $Li_2CO_3$—$Na_2CO_3$ is illustrated in FIG. 7. The eutectic point 7001 of the binary system occurs at 44.3 wt. % of $Li_2CO_3$ at a temperature of 495.8° C. To illustrate the operation of the embodiment system, an initial condition is chosen with the superheated liquid state D in FIG. 7 at the eutectic composition of 44.3 wt. % of $Li_2CO_3$ and the temperature of 800° C. The thermodynamic state of the system moves down vertically, while discharging the stored thermal energy in heat recovery exchanger 870 in FIG. 8, with a fixed composition of 44.3 wt. % of $Li_2CO_3$ on composition axis 7200 following temperature 7100 until the liquid stream cools down to a temperature of 600° C. at point E in the figure. The cooled liquid stream 874 is subsequently heated up again to the temperature of 800° C. at the same concentration to liquid state D by power tower receiver 880. By using the STES system in FIG. 8, thermal energy can be saved and then released by repeating this procedure.

As explained previously, this molten carbonate salt binary system of $Li_2CO_3$—$Na_2CO_3$ is a very effective heat storage medium for STES for working temperatures above 600° C., and can be used up to 800° C. being higher than the service temperature of the solar salt heat storage system by 235° C.

The molten eutectic salt liquid of $Li_2CO_3$—$Na_2CO_3$ as a HTF is compared with the requirements for the HTF suggested by the SunShot Initiative of D.O.E. in four perspectives. As shown in Table 5, the molten $Li_2CO_3$—$Na_2CO_3$ liquid is comparable with the D.O.E. requirements except the melting point. The melting point of 496° C. as compared to <250° C. causes additional efforts in operation and maintenance; (i) The higher melting temperature will require to pay closer attention to the startup in the morning, the shutdown in the evening, and the daytime operation on windy days; (ii) The blockage by the frozen solid salt plugs in the process equipment and transport piping will be more frequent with an increase of the melting point; (iii) The cost for heat tracing for freezing protection increases with the increase of the melting temperature; (iv) The solar utility plants with the molten salt HTF is more conveniently operated with the larger electricity generation capacities, as the technical supports and the ancillary facilities for maintenance will be readily available; for the smaller capacities, being possibly located in the remote and isolated places, the plants with the gaseous HTF will be more advantageous.

TABLE 5

Comparison with the D.O.E. HTF Specifications

| Properties | D.O.E. Specifications | Molten $Li_2CO_3$—$Na_2CO_3$ Liquid |
|---|---|---|
| Thermal Stability | >800° C. | up to 1000° C. |
| Specific Heat, J/g K | >3.0 (>3 KJ/L K) | 2.09 (4 KJ/L K) |
| Melting Point, ° C. | <250 | 496° C. |
| Cost, $/Kg | 1 | 0.77 |

Figure 8:
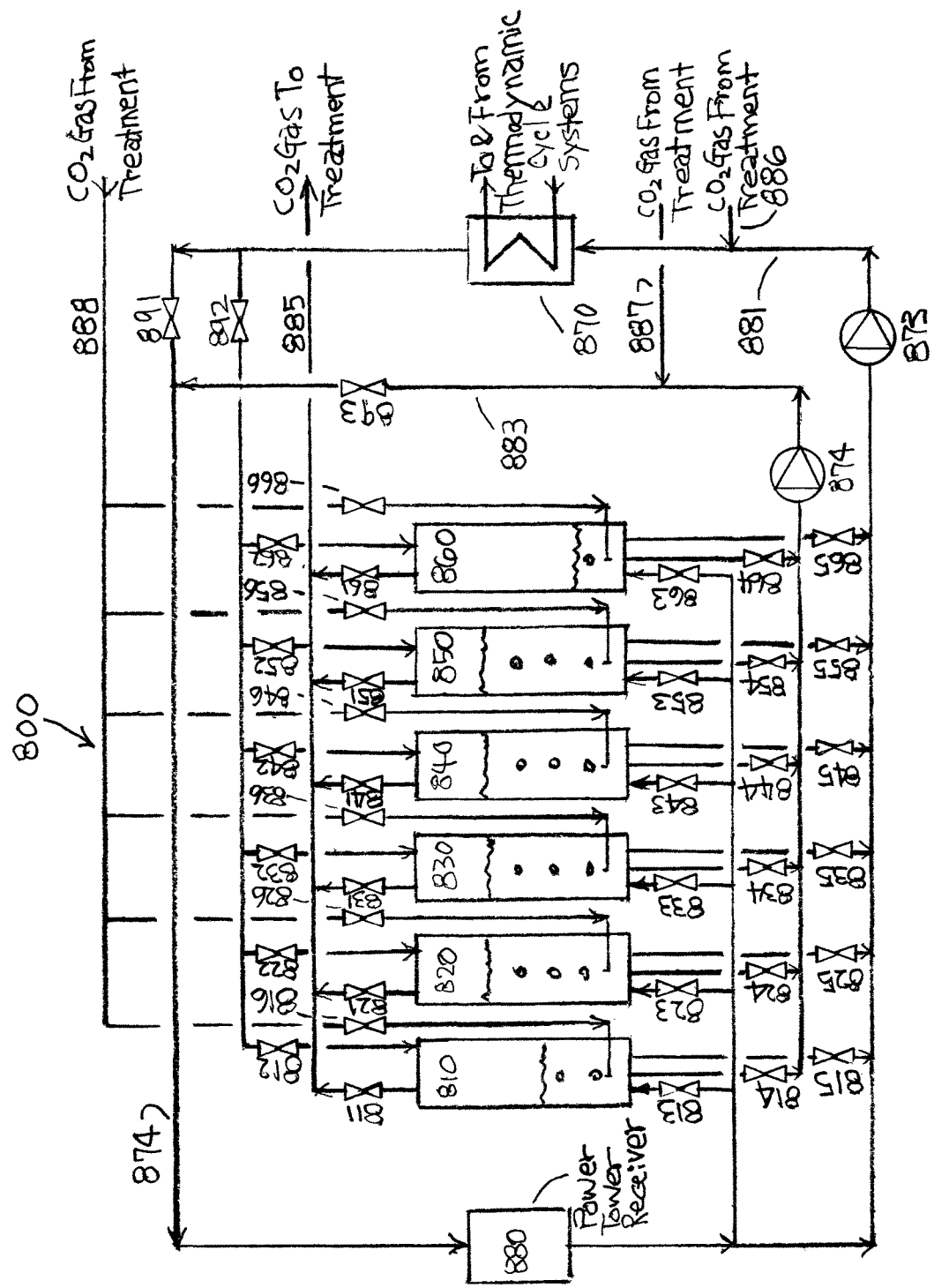
FIG. 8 is a schematic flow chart of a process for a multi-chamber STES system with a molten carbonate salt liquid of a eutectic binary mixture of $Li_2CO_3$—$Na_2CO_3$ as a TES medium and a HTF.

The multi-chamber STES system with a molten eutectic binary mixture of $Li_2CO_3$—$Na_2CO_3$ being used as a TES medium and also as a HTF is illustrated in FIG. 8. The gaseous $CO_2$ injection is made in order to maintain the $CO_2$ partial pressure for the molten salt liquid to be high enough to suppress the decomposition of the carbonate salt. In FIG. 8, all the component numbers are given the identical last two digits to those of FIG. 6 with the first digit being changed to 8 from 6. The items having the same numbers for the last two digits in FIG. 8 as in FIG. 6 work in the same way as in the latter figure. Also, four additional streams 885, 886, 887 and 888 have been added in FIG. 8; stream 886, 887 and 888 are for the $CO_2$ streams being injected into the process stream 881, process stream 883, and the molten salt liquid layers in the chambers, respectively, and stream 885 is for the $CO_2$ gas withdrawn from the headspaces of the chambers. The withdrawn $CO_2$ gas is then re-compressed, and returns to the process for injection again.

The multi-chamber STES system is controlled by a system controller for the following process control scheme; (i) The thermal mixing is avoided as much as possible; from the power tower receiver to the thermodynamic cycle engines, the highest thermal efficiencies for heat storage and heat recovery should be attained with the minimum loss of the available work; (ii) An empty chamber is provided in sequence to receive the charged stream in the daytime and the discharged stream in the nighttime, resulting in appreciable saving on the heat storage volume; (iii) A gaseous $CO_2$ is injected into all separate liquid streams and the molten salt liquid layers in the chambers to prevent decomposition of the molten carbonate salts.

The multi-chamber STES system with a molten carbonate salt liquid used as both a TES medium and a HTF has many advantages for electricity generation of larger capacities; (i) The STES system is very simple to operate while achieving the high heat storage and heat recovery efficiencies; (ii) The molten salt of $Li_2CO_3$ and $Na_2CO_3$ is stable in $CO_2$ atmosphere up to 1000° C.; (iii) The molten salt of $Li_2CO_3$ and $Na_2CO_3$ is the mildest in corrosiveness among the candidates, and the methods to mitigate the corrosiveness have been well studied; (iv) The multi-chamber STES system makes appreciable saving on heat storage volume.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A sensible thermal energy storage (STES) system comprising:
   - a plurality of chambers, each chamber having a layer of superheated molten salt liquid (SMSL) of a multi-component system comprising of a eutectic composition above the liquidus temperatures;
   - wherein said SMSL is used as both a thermal energy storage (TES) medium and a heat transfer fluid (HTF);
   - wherein an empty chamber is made available in a sequence operation out of said plurality of chambers to receive SMSL streams through an outside heat exchange device, said SMSL having originated from one of said a plurality of chambers;
   - wherein said SMSL is selected from a group comprising $Li_2CO_3$—$Na_2CO_3$, $Li_2CO_3$—$K_2CO_3$ and $Li_2CO_3$—$K_2CO_3$—$Na_2CO_3$;
   - wherein gaseous $CO_2$ is evenly injected into the SMSL streams in transfer lines and the SMSL layers in the chambers with sufficient pressure to prevent decomposition of the molten carbonate salts; and
   - wherein the $CO_2$ gas is removed from said chambers, cooled, compressed, heated and returned for injection again into the process streams and the SMSL layers in the chambers.

2. A method of thermally charging a sensible thermal energy storage (STES) system, the STES system having a thermal energy source, a plurality of chambers and a heat recovery exchanger operably coupled with each other such that a superheated molten salt liquid (SMSL) having a multi-component system comprising a eutectic composition above liquidus temperatures between a high temperature $T_h$ and a low temperature $T_l$ is circulated between the thermal energy source, plurality of chambers and heat recovery exchanger, the method comprising steps of:
   a. supplying SMSL having a high temperature $T_h$ from the thermal energy source to an empty first chamber until completely full, while SMSL having a low temperature $T_l$ is supplied from a second chamber to the thermal energy source until the second chamber is completely empty;
   b. supplying SMSL having a high temperature $T_h$ from the thermal energy source to the empty second chamber until completely full, while SMSL having a low temperature $T_l$ is supplied from a third chamber to the thermal energy source until the third chamber is completely empty;
   c. when the SMSL from the thermal energy source is lower in temperature than high temperature $T_h$, supplying SMSL having a high temperature $T_h$ from one of the first and second chambers to the heat recovery exchanger; and
   d. when the SMSL from the thermal energy source returns to a high temperature $T_h$, supplying SMSL having a high temperature $T_h$ from the thermal energy source to one of the first and second chambers from which SMSL was withdrawn in step c;
   wherein gaseous $CO_2$ is evenly injected into the SMSL in transfer lines and in the chambers with sufficient pressure to prevent decomposition of the molten carbonate salts; and
   wherein the $CO_2$ gas is removed from said chambers, cooled, compressed, heated and returned for injection again into the SMSL in the transfer lines and chambers.

* * * * *

UNITED STATES PATENT AND TRADEMARK OFFICE
CERTIFICATE OF CORRECTION

PATENT NO. : 10,254,012 B2
APPLICATION NO. : 15/258713
DATED : April 9, 2019
INVENTOR(S) : Peter B. Choi Page 1 of 1

It is certified that error appears in the above-identified patent and that said Letters Patent is hereby corrected as shown below:

In the Specification

In Column 15, Line 41, "3c" should be changed to --3̄c--; and
Line 48, "3c" should be changed to --3̄c--.

Signed and Sealed this
Tenth Day of September, 2019

Andrei Iancu
*Director of the United States Patent and Trademark Office*